(12) United States Patent
Schegerin

(10) Patent No.: US 9,753,051 B2
(45) Date of Patent: Sep. 5, 2017

(54) SPEEDOMETER INSENSITIVE TO ICY CONDITIONS AND HEAVY RAINFALL

(75) Inventor: Robert Schegerin, Chevilly-Larue (FR)

(73) Assignee: AER, Chevilly-Larue (FR)

( * ) Notice: Subject to any disclaimer, the term of this patent is extended or adjusted under 35 U.S.C. 154(b) by 806 days.

(21) Appl. No.: 14/236,679

(22) PCT Filed: Jul. 27, 2012

(86) PCT No.: PCT/FR2012/000313
§ 371 (c)(1),
(2), (4) Date: May 9, 2014

(87) PCT Pub. No.: WO2013/017746
PCT Pub. Date: Feb. 7, 2013

(65) Prior Publication Data
US 2014/0257745 A1    Sep. 11, 2014

(30) Foreign Application Priority Data
Aug. 4, 2011 (FR) ..................................... 11 02446

(51) Int. Cl.
*G01P 5/00*     (2006.01)
*G01P 5/16*     (2006.01)
*G01P 13/02*    (2006.01)

(52) U.S. Cl.
CPC .............. *G01P 5/16* (2013.01); *G01P 13/025* (2013.01)

(58) Field of Classification Search
CPC . G01S 17/95; G01S 7/497; G01P 5/00; G01F 1/20; G01F 1/66; F05B 2260/82
See application file for complete search history.

(56) References Cited

U.S. PATENT DOCUMENTS

| 3,882,721 A | 5/1975 | Neary et al. |
| 4,920,808 A | 5/1990 | Sommer |

(Continued)

FOREIGN PATENT DOCUMENTS

| DE | 675846 C | 5/1939 |
| DE | 102007053273 A1 | 2/2009 |

(Continued)

OTHER PUBLICATIONS

Airworthiness Directive, AD No. 2009-0195 dated Aug. 31, 2009, 3 pages.

(Continued)

*Primary Examiner* — Elias Desta
(74) *Attorney, Agent, or Firm* — Kilpatrick Townsend & Stockton LLP; Dean W. Russell

(57) ABSTRACT

The present invention relates to a speed measurement system allowing the relative speed V of a moving body in relation to an ambient air mass to be measured independently of the atmospheric conditions, the moving body being designed to move at least at subsonic and transonic speeds. The speed measurement system comprises:
  a fin of elongate shape positioned in the ambient air mass and the profile of which comprises a portion A and a portion B, at least one heating means, at least one dynamic-pressure tap PB situated in the portion B, an angle BETA defined between the axis OX and intrados or extrados of the portion A of the fin;
  at least one static-pressure tap PS
  at least one means of measuring and/or calculating the angle of attack and possibly at least one means of measuring and/or calculating the sideslip angle,
  at least one calculation means configured to determine the speed V of the moving body with respect to the ambient air mass (7) from the static pressure PS and dynamic (Continued)

pressure PB values and possibly from the value of the angle of attack ALPHA of the fin and/or the sideslip angle GAMMA, and do so in an injective, univocal manner throughout the subsonic and transonic domain.

13 Claims, 11 Drawing Sheets

(56) References Cited

U.S. PATENT DOCUMENTS

| | | | |
|---|---|---|---|
| 5,415,049 A | 5/1995 | Takami et al. | |
| 6,807,468 B2 * | 10/2004 | Campbell | G01C 21/165 701/14 |
| 2011/0141470 A1 * | 6/2011 | Renard | G01P 5/26 356/342 |

FOREIGN PATENT DOCUMENTS

| | | |
|---|---|---|
| EP | 0176405 A1 | 4/1986 |
| EP | 0255056 A2 | 2/1988 |
| FR | 2833347 A1 | 6/2003 |
| FR | 2833709 A1 | 6/2003 |
| FR | 2908882 A1 | 5/2008 |
| WO | 99/61924 A1 | 12/1999 |
| WO | 01/44820 A1 | 6/2001 |
| WO | 02/086516 A1 | 10/2002 |

OTHER PUBLICATIONS

PCT/FR2012/000313, International Search Report dated Jan. 3, 2013, 3 pages.
PCT/FR2012/000313, Written Opinion, including English translation, dated Jan. 3, 2013, 16 pages.
PCT/FR2012/000313, International Preliminary Report on Patentability, including English translation, dated Feb. 4, 2014, 18 pages.

* cited by examiner

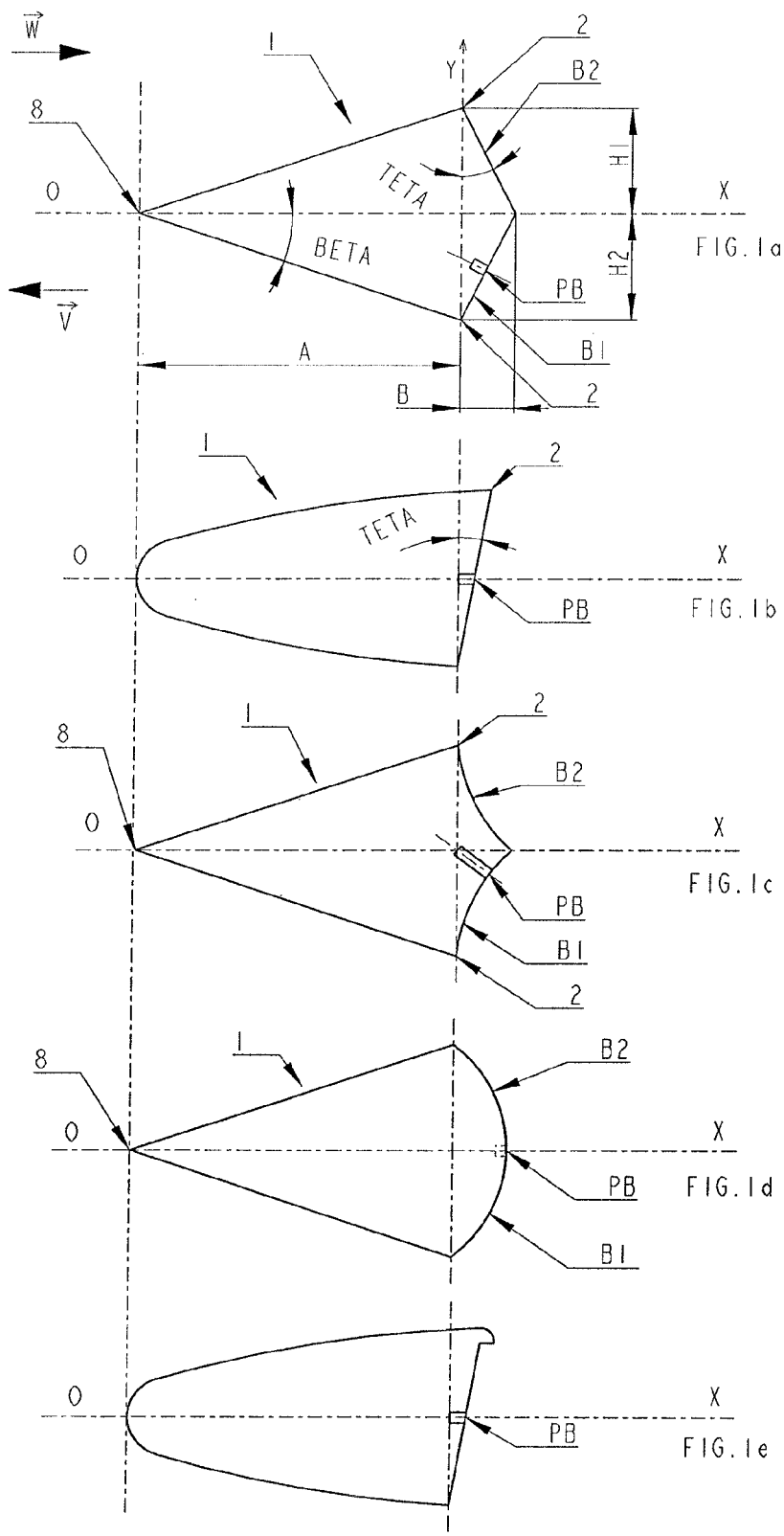

SPEEDOMETER INSENSITIVE TO ICY CONDITIONS AND HEAVY RAINFALL

CROSS REFERENCE TO RELATED APPLICATIONS

This application is the U.S. national phase of International Patent Application No. PCT/FR2012/000313 filed Jul. 27, 2012, which application claims priority to French Patent Application No. 1102446 filed Aug. 4, 2011, the entire contents of both of which are incorporated herein by reference.

FIELD OF THE INVENTION

The present invention relates to a multifunction device for mainly improving the reliability of measurements of relative velocities of a fluid relative to a solid structure.

It concerns, more particularly, the measurement of the speed of a gas with respect to a structure, for example the reliable measurement of the relative air speed with respect to a structure, such as the ambient air around a structure in motion.

It is quite suitable, also, to measure the speed of an air mass moving relatively to a fixed structure.

It is particularly suitable, also, to measure the aerodynamic speed of an aircraft or a drone in unusual atmospheric conditions, especially in icing and/or under heavy rain conditions.

It provides optionally a multi-physical measurement of the aerodynamic and/or thermodynamic parameters for a mobile body or other structure in motion with respect to airflow or an ambient air mass.

It helps avoiding all risks related with exceptional weather conditions in order that the velocity measurements are not erroneous.

BACKGROUND OF THE INVENTION

Currently, commercial aviation is relatively safe, if we compare the number of accidents to the number of passengers kilometers traveled.

However, the number of accidents is still too high. The media impact of a severe accident is substantial, and significantly slows the development of an industry that is expected to grow in future years.

The measurement of the speed of an aircraft relative to an air mass is essential for safety. Indeed at low altitude and low speed the aircraft may stall, and at high altitude a small range allows the aircraft to remain in the air. Indeed, given the low air density at altitude the aircraft will stall if it does not move at a relatively high speed, while an over speed leads to the destruction of the aircraft.

Furthermore automatic aircraft systems (e.g., autopilot, auto throttle) are connected directly to the indications of speed relative to the ambient air. A false indication of speed can cause serious accidents especially in case of false simultaneous information in several speed sensors.

Several accidents are due without any doubt to a false indication of the speeds probes. In other serious cases, speed misrepresentations are suspected to have been a direct or indirect cause of serious incidents.

The events of a malfunction of current probes are usually held in exceptionally difficult weather conditions, e.g., icing conditions and/or heavy rain and/or high pressure.

Airworthiness Number 2009-0195 issued by the European Aviation and Space Agency (EASA) said that some speed probes must be replaced by others considered more reliable in icing conditions or heavy rain.

"Pitot" probes from the name of their inventor exist for hundreds of years. They were used on ships and improved by Mr. Ludwick Prandtl.

Pitot probes or Prandtl tubes are used routinely on current aircraft both civilian and military. They have an opening at the front of the probe. This opening is connected to a pressure sensor. This pressure is called the total pressure. This total pressure is compared with a static pressure measured on the sensor itself or at another location of the plane. This so-called total pressure is always greater than or equal to the static pressure. Laws of correspondence enable the computation of the airspeed of the plane from the measured values of total pressure and static pressure.

These probes are simple, accurate, but are sensitive to exceptional weather conditions such as heavy icing and/or heavy rain conditions. They are usually heated, but if, for example, the diameter of ice in the air through is greater than the input port of the probe, it is likely that this probe will be clogged and will no longer work properly.

Moreover in general, these probes comprise a discharge water drain. This allows the drainage of a given water flow. If the ingested flow of water by the Pitot tube is higher than the maximum water flow rate of the drain, it is likely that the probe can no longer function. We can cite some intrinsic deficiencies of this type sensor:

Density error: These errors affect the measurement of speed and altitude. This error is due to pressure changes in the atmosphere that are not related to altitude (Meteorology);

Compressibility error: Measurement errors occur when the approximation of the incompressible regime can no longer be made and that the formula calculating the speed no longer applies. This intrinsic error occurs especially at high altitudes, where the speed of sound is less than its value at sea level. These errors become significant for above 10000 feet and above 200 knots speed altitudes. Under these conditions, the speedometer reports less than the actual speed of the aircraft speed;

Mechanical hysteresis due to the properties of the aneroid capsule contained in the measuring instrument. This hysteresis effect can be caused by an abnormal change in the inclination of the apparatus. This error is characterized by a false value temporarily in inclination measurement and during the reversal hysteresis in the altitude measurement and the measurement of the vertical velocity;

Position Error. This error occurs when the static pressure measured by the tube is different from the real atmospheric pressure away from the unit, particularly when the airflow around the device is not equal to the actual speed of the unit. This may be caused by one or more factors: the angle of attack, the weight of the device, the acceleration, and, in the case of helicopters, the airflow created by the movement of the blades. The reading error can be positive or negative depending on the factors involved. The position errors may be a fixed value (which depends only on the model of the device and can be calibrated) and/or a variable value which can arise from mechanical deformations locally changing the airflow, or special flight situations.

Conventionally, "Pitot" sensors type are used to measure airspeed in aircraft, yet these probes seem to cause problems in some exceptional conditions of highly icing and/or in heavy rains. However, the maximum security required in aviation is not reached in the case where the cause of fault is very exceptional atmospheric phenomena. In fact increasing the number of identical probes placed under the same conditions does not create a true redundancy. It is therefore important in order to further improve the reliability of complete system to remember that it is better to have a true redundancy of subsystems.

SUMMARY OF THE INVENTION

The proposed invention solves the problem of the reliability of the sensors speeds in exceptional weather conditions, while avoiding the defects and errors previously identified, particularly in exceptional freezing icing and/or conditions or heavy rain. It fights the universally accepted idea that only a "Pitot" tube can measure the speed relative to the air of an airplane from measuring the total pressure or stagnation pressure.

Another object of the invention is to present a multi-physical measuring system for aerodynamic and/or thermodynamics parameters of a mobile body with respect to an airflow or a mass of ambient air in aerodynamic and/or thermodynamic complex conditions.

The invention solves the problem by proposing a multi-physical system for measuring aerodynamic and/or thermodynamic parameters of a movable vehicle or structure relative to an airflow or to an ambient air mass, especially a speed measurement system having a structure and/or a particular form in order to avoid all defects and errors previously defined, said speed measurement system measuring the speed of a movable vehicle relative to the ambient air mass from the measurement of dynamic pressure. In this way, it is possible to easily retrieve the value of the speed of the moving object for each value of the angle of attack and the angle of sideskid without measuring the total pressure or the stop pressure. It is also possible to overcome the problems of sensitivity to high pressure because the actual measured dynamic pressure is always less than or equal to the static pressure.

The invention also allows providing an additional solution to the Pitot tube, creating a set of redundant measurements by eliminating the common failure modes of the measurement.

Other means of measuring the speed of an aircraft have been proposed, including laser optoelectronic measurements. All these proposed means for measuring the speed of an aircraft relative to ambient air have led to methods of excessive mass and/or cost and are not usable.

Improvements to "Pitot" tubes have been proposed to make them less susceptible to icing conditions and/or heavy rainfall. Heating of "Pitot" tubes exist for a very long time especially to prevent the formation of ice around these tubes. Unfortunately, the proposed solutions have limitations that make <<Pitot>> tubes seem to be always sensitive to exceptional weather conditions (hail diameter, ingested water flow). Indeed, as soon as a port is placed forward to the movable profile in motion, the probability that it is clogged by a hailstone or a strong water flow is not null.

In order to protect particle injection risks such as dust, ice or water, it is important not to place any pressure tap on the leading edge. Indeed any opening on the leading edge is subject to liquid or solid particle injections. A pressure tap placed in conjunction with an opening on the leading edge of a profile has a good chance to have an erratic operation in certain atmospheric conditions, including exceptional weather.

When studying the evolution of existing pressures around a wing shape we see in conventional prima facie that it is possible to define pressure coefficients Cp which depend only on the profile, on the location considered on the profile and profile angle of attack. By measuring the pressure on a characteristic profile location, it seems possible to calculate the relative velocity of the fluid providing that the static pressure of the fluid at the upstream infinity is known and providing that the angle of attack of the profile is known. Unfortunately this Cp concept found in many books and documents, if it is correct in the case of a subsonic speed (Mach number comprised between 0 and about 0.7), does not make any sense in transonic speed (between about Mach 0.7 and Mach 0.99). In effect, the pressure curve on one point of the profile as a function of the Mach value is an increasing curve between 0 and the critical Mach number, which is the value for which the speed of at least one point of the profile is greater than the speed of sound and then decreases again. Beyond critical Mach number, for a given pressure value, do correspond two different values of the speed of the mobile body. This curve is not univocal nor bivocal and it is therefore impossible to determine the aircraft speed from the pressure value on a profile for an object moving in subsonic and transonic speed. The use of the pressure coefficients Cp can therefore be used only for subsonic speed. Depending on the shape of the profile, the value of the critical Mach number is between 0.6 and 0.8. However, current commercial aircraft and business jets fly at speeds above the critical Mach number and evolve in subsonic and transonic speed domains. The use of pressure coefficients Cp is not possible throughout the flight envelope of modern aircraft.

Furthermore, the calculation of the speed of an aircraft relative to the ambient air mass must be very reliable and accurate (i.e., generally better than one percent) in order to be used by the pilot and by the aircraft automatic piloting systems.

Document FR 021355 comprises a doubling of the Pitot tube. This device comprises two holes for the pressure outlet 7 and 8. Unfortunately these two ports 7 and 8 are directed forward and are therefore likely to be blocked by ice.

Document FR 0116160 describes a system comprising an opening 21 directed forward and therefore heavily influenced by the ice in the atmosphere. This device does not allow the proper operation independently of ice cubes size and water flow ingested.

Document FR 0115991 discloses a method of heating and measuring the temperature of the integrated air. Unfortunately this device does not solve the problems posed by the presence of ice or heavy rain in the atmosphere.

The document U.S. Pat. No. 4,920,808 presents a bulb placed in the airflow and including pressure taps. There is no mention of the form of individual profiles or specific positions of the pressure taps to obtain a unique value or bivocal speed of flow in the entire subsonic and transonic domain.

Document DE 10 2007 0532 73 discloses a system for measuring fluid flow in a pipe. This system comprises a pressure tap at the stop point upstream and a pressure tap at the downstream of the profile. This system does not allow overcoming the problems related to icing and heavy rains accumulating ice and water in the pressure tap in the leading edge of the profile.

EP 0255056 discloses a device for measuring the flow velocity of a fluid in a pipe by providing a differential between the static pressure and the dynamic pressure. This document does not seem to be in the same technical domain than the one proposed in the present invention and does not resolve the technical problem posed by the present invention.

Document U.S. Pat. No. 5,415,049 also discloses a device for measuring the wind speed by comparing a dynamic pressure and a static pressure via two pressure measuring points at the top of elements lying within a flow.

Document U.S. Pat. No. 3,882,721 discloses a movable fin about an axis to measure the attack angle of an airplane, but does not mention the measurement of speed.

WO 01/44820 discloses a probe placed in an airstream comprising means to rotate it according to the airflow, and pressure measuring means disposed on the side walls of the probe. There is no mention of speed measurement.

Document DE 675 846 discloses an aircraft airspeed sensor having a truncated cone-shaped comprising a front portion and a rear portion, at least one dynamic pressure tap and at least one static pressure tap and a heating means. Pressure taps are formed by at least one annular cylindrical slot. The front part of the anemometer constituting the leading edge is a deflector that can be used either to control or to deviate the airflow along the anemometer in a desired direction so as to prevent the anemometer to undergo aerodynamic turbulence. This edge can in some cases be a spherical head.

However, this device is not a fin and does not solve the technical problems related to the precision of the velocity measurements and icing problems in exceptional weather conditions. The absence of direct means for measuring the speed, the angle of attack and sideslip of the airplane and inadequate form, makes it impossible to calculate accurately the speed V of a mobile aircraft in the entire flight envelope, at subsonic or transonic speed. Thus, this device does not resolve the technical problem of the present invention object.

Document FR 2908882 discloses a device and method for measuring the total pressure of a flow. This device includes a Pitot tube, means for taking pressure at the stop point and means for comparison of measured pressures by the Pitot tube and the means of measuring the total pressure at the stop of the fluid. However, this device does not solve the problem of measuring the speed of a mobile body in motion relative to an air mass in complex thermodynamic or aerodynamic conditions.

Document EP 0176405 discloses an aircraft multifunction probe for measuring aerodynamic parameters of a flow using a fin. Said probe eliminates errors due to mechanical angle of attack measurement. To do this, this measurement is corrected by a measure of pneumatic angle of attack. The aerodynamic angle of attack is measured with two pressure taps arranged symmetrically to the leading edge of the fin on the intrados side and the extrados side. The pneumatic angle of attack is measured by two pressure taps disposed symmetrically on either side of the leading edge of the fin. Said fin has a half-delta wing shape which can be electrically heated to prevent icing problems. Said fin comprises a first portion forming the leading edge, a second portion in the extension of the first portion forming the rear fin, and a third portion, of substantially rectangular shape, placed on the second portion. The thickness of the first portion is substantially increasing towards the second portion and the second portion is substantially constant. Said fin further includes at least one total pressure tap (7) disposed on the front part of the third portion and two static pressure taps (6, 6') disposed symmetrically on either side of the leading edge of the fin on the first portion. A calculating means for determining the speed of the mobile body based on the angle of attack and total and static pressures.

Unfortunately, the speed measurement system according to EP 0176405 measures a stop pressure that is always greater than the static pressure and thus sensitive to high pressures, by nature sensitive to the accumulation of frost and ice as a conventional Pitot tube. Moreover, the profile of the function binding the velocity and static and dynamic pressure for each value of the angle of attack is not known. It is therefore difficult to give a reliable estimate or to deduct efficiently or simply the speed V of the mobile body. This document also does not show how to avoid the boundary layer that is likely to influence the measurements of dynamic and/or static pressures. Similarly the dimensions of the fin and the shape of the fin shown in FIG. 1 of this document do not make possible to solve the problem of the boundary layer drag. The total pressure tap placed on the third portion of the fin in front of the fluid does not allow overcoming problems related with icing and heavy rains, by accumulating ice and water since it receives the fluid directly. This is the main drawback of <<Pitot>> tubes. We also note that the overall shape of the fin having substantially a step shape is not suitable for directing the flow into the main flow axis of the ambient air mass circulation and does not stabilize the shockwave in transonic speed, which generates strong turbulences in the rear part of the fin.

The object of the invention is to remedy to these drawbacks.

In the following description, the terms listed below shall have the following definition:

Pitot tube: tube for taking dynamic pressure of a fluid in relative movement and having a forwardly opening.

Prandtl tube: improved Pitot tube comprising an integrated static pressure tap.

Airfoil maximum thickness: this is the maximum cross section of a body, that is to say the surface exerting the greatest resistance facing the wind flow around the body.

Forward direction: the direction from which comes the relative wind.

Rear Direction: The direction where goes the relative wind.

Leading edge: this is the part that is in front of the portion having the airfoil maximum thickness, facing the wind.

Centre of aerodynamic lift: this is the point where the resultant of all the aerodynamic forces applied to a solid consists of a single force and a momentum equal to zero.

Static pressure: pressure independent to speed.

Stop Pressure: the pressure created by or on a fluid in motion at the stop point. It does not therefore depend on the surface but only on the speed and density of the fluid. In aeronautics, the stagnation pressure is added to the static pressure to give the total pressure that can be measured at the zero speed point or stop point by a Pitot tube.

Dynamic pressure: This is a pressure which depends on the speed

Extrados: surface located above the wing.

Intrados: domain located under the wing.

Univocal function from Y to X: function Y=f(X) such that at one or more values of Y corresponds one and only one value of X.

Bivocal function: function Y=f(X) such that at a value of X corresponds one and only one value of Y and that at a value of Y corresponds one and only one value of X.

The mobile body speed V: the speed V is defined in Mach number that is to say with respect to the speed of sound which is equal to Mach=1 in the considered environment.

Critical Mach number: The flow around a wing passes from subsonic to transonic speed when in a portion the local velocity becomes equal to the speed of sound. The corresponding Mach number, less than 1, is called the critical Mach number.

Subsonic speed: Mach number comprised between 0 and the critical Mach number.

Transonic speed: Mach number comprised between critical Mach number and Mach 1.

Supersonic speed: Mach number greater than Mach 1.

Sharp angle: a line limiting two straight or curved surfaces that form the faces of a dihedral angle, or more specifically the side of a face of a polyhedron, said angle having a small radius.

The invention manages to resolve the above problems by providing a device for reliably measuring the velocity of a fluid containing solid or liquid or gaseous elements having a density different from that of said fluid, with respect to a mobile or fixed structure independently for example to icing or heavy rain conditions throughout the entire flight envelope including subsonic and transonic regime.

To this end, the invention provides a speed measurement system for measuring the relative velocity V of a moving vehicle relative to an ambient air mass regardless of weather conditions, the moving vehicle being adapted to move at least at subsonic and transonic speeds, said speed measurement system comprising:

An elongated fin disposed in the ambient air mass, said fin having a longitudinal axis OX, a spanwise axis ZZ', and comprising:

A portion A and a portion B, said portion A having a thickness increasing in the direction of B and forming the leading edge of the fin, said portion B, of decreasing thickness, being located at the rear of portion A and forming the aft part of the fin, At least one heating means defined to avoid any risk of icing, At least one dynamic pressure tap PB located in the B portion, An angle BETA defined between the axis OX and the lower surface or upper surface of the A portion of the fin At least one static pressure tap PS placed on the fuselage or on the base of the fin, At least one means for measuring and/or calculating the angle of attack ALPHA of the fin and optionally at least one means for measuring and/or calculating the sideslip angle GAMMA of the plane, At least a calculating means configured to determine the speed V of the mobile body relative to the ambient air mass from the values of static pressure PS and dynamic pressure tap PB and eventually the angle of attack ALFA of the fin and/or the sideslip angle GAMMA, characterized in that, the fin being relatively thin and having a wedge shape at least in its front part (portion A), the leading edge of the fin forming a sharp edge having a radius at least inferior or equal to 2 mm, Said fin having an at least partially tapered truncated portion and comprising at least one sharp edge having a radius of at least less than 2 mm between the portion A and the portion B so that in transonic speed, the shock wave created near this said sharp edge is stabilized and/or the path of airflow lines is changed to the rear of the fin, The portion B, forming the rear part of the fin, comprising at least one domain having a concave or convex circular shape, B1 and/or B2 in order to filter the particles, so that the particles having a greater density than the density of the air, trapped in the fluid flow to the rear of the fin, are ejected and/or separated under the effect of centrifugal forces to the domain near the pressure tap PB, said domain B1 and/or B2 enabling to channel and/or to stabilize the path of the airflow to the rear of the fin, said fluid flow having a roll shape and/or a vortex shape being substantially parallel to the axis ZZ', the function F (V)=(PS−PB)/PS enabling to derive the relative speed V of a mobile body with respect to an ambient air mass regardless of weather conditions, is a univocal function in the direction (PS−PB)/V to PS, strictly increasing as a function of the speed V, preferably as a function of the Mach number, this in the entire subsonic and transonic flight domain, for each value of the angle of attack ALPHA and/or optionally of the sideslip angle GAMMA.

Advantageously, the fin device comprises at least one rib disposed substantially perpendicular to the spanwise axis ZZ' of the fin and extending at least in the portion B of the fin, said rib being adapted to channel the airflow in a region near the outlet of dynamic pressure tap PB to the rear fin domain.

The shape of the fin defined according to the invention enables to change the direction of the lines of flow of the fluid, to avoid excessive drag, to stabilizing the shockwave in transonic speed, to improve the glide ratio and to balance the lift forces around the fin. Therefore, the measurement of dynamic pressure leading to the speed of the mobile body is not erroneous.

The fin according to the invention is less sensitive to high pressures because the measured dynamic pressure is always lower than the static pressure. It is less sensitive to strong icing conditions because it has a structure and/or a particular shape in its rear part allowing it to filter the particles of higher density than the density of the air and to remove the said particles from the domain close to the PB pressure outlet. In this way, the fin is not clobbered by particle flow having a density greater than the density of the air, such as the ice particles.

The fin according to the invention also enables to avoid errors due to the compressibility by using a method determining the speed V of the mobile body defined by a univocal function within the direction of (PS−PB)/PS, strictly increasing as a function of the Mach number, for each value of the angle of attack ALPHA and optionally of the angle GAMMA.

The fin may be provided to guide the flow in the rear portion close to the pressure tap PB homogeneously by the establishment of a vortex flow for discharging the particles of higher density than the density of the air.

Having the pressure tap PB in the rear part of the fin ensures that the actual pressure tap PB is not hit hardly by the fluid particles susceptible to clog it.

Having the ribs allows the fin to channel the airflow (field lines) in an domain near the dynamic pressure tap PB domain because after having change the field lines flow in the front part it is established an aerodynamic turbulence in the rear part in the form of a vortex. This turbulence is due to a drag form, which is minimized by the fin having a beveled shape at least partially truncated and comprising at least one sharp angle between the portion A and the portion B. This allows a dynamic pressure measurement without disturbing the portion B.

Alternatively, the calculating means is adapted to, depending on the measured static pressure, select a law connecting univocally the dynamic pressure tap PB to the speed V, apply a correction factor in function of the angle of attack ALPHA of the fin, and determine the value of the speed V of the mobile body relative to the air mass.

Alternatively, said system further comprises speed measurement elements protruding beyond the structure, substantially perpendicular to a wingspan axis of the fin and disposed in the portion B of the fin, said protrusions being adapted to channel the airflow close to dynamic pressure tap PB.

The fin is typically rotatable mounted about an axis XX', said axis XX' being fixed with respect to the mobile body and substantially perpendicular to the direction of the speed V of the mobile body relative to the ambient air mass, the center of gravity of the assembly comprising the fin parts and parts integrally attached to the fin and located substantially on the axis XX' and the aerodynamic center of the fin is located behind the axis XX' relative to the direction of the velocity V.

Speed measurement system typically further comprises a measurement means at every moment of the rotation angle of the fin about the axis XX', defining the angle of attack of the speed V of the mobile body relative to the ambient air mass.

Alternatively, said system further comprises, mounted on the same mobile body, another measurement indicator type "Pitot tube", and means for comparing the velocity measurements made by said Pitot tube and said calculating means.

Alternatively, taking dynamic pressure tap PB includes a plurality of ports connected to a plenum chamber formed in the fin, said plenum being adapted to allow a stable establishment of the pressure measured by taking dynamic pressure tap PB.

According to a particular embodiment, the fin is such that:
The length of the portion A attached to the Ox axis is between 70 and 80 mm,
The length of the portion B attached to the Ox axis is between 4 and 10 mm,
The height of the fin is between 4 and 10 mm,
The portion A has an inclination of between 3 and 10 degrees relative to the axis Ox locally at its connection with the portion B,
The B portion has an inclination between 20 and 60 degrees with respect to the axis Oy locally at its connection with the portion A.

The invention also provides a method of determining the relative velocity V of a moving vehicle relative to an ambient air mass by means of a speed measurement system described above wherein the velocity V in Mach of the mobile body relative to the ambient airflow, is determined from values of static pressure PS and dynamic pressure tap PB for each angle of attack ALPHA and/or sideslip angle GAMMA of the speed measurement system, and this being defined univocally in the direction of (PS−PB)/PS to V in the entire subsonic and transonic domain; that is to say for each value of PB and PS pressure for an angle of attack ALPHA and/or possibly sideslip angle GAMMA does correspond one and only one velocity value V.

The said method comprises the following steps:
The static pressure PS is measured,
In case of slippage of the aircraft, two static pressures PS1 and PS2 are measured and one static pressure PS is deduced corresponding to the average of static pressures measured PS1 and PS2,
PB fin dynamic pressure is measured,
For each value of angle of attack ALPHA and/or the sideslip angle GAMMA, the function F (V)=(PS−PB)/PS is selected univocal in the direction (PS−PB)/V to PS, strictly increasing as a function of the Mach number,
To said function is applied a correction factor corresponding to said value of the angle of attack ALPHA of the fin and/or optionally of the sideslip angle GAMMA,
A new function F (V)=(PS−PB)/PS adjusted for the influence of said angle of attack ALPHA and/or optionally said slip angle GAMMA is obtained,
It is deduced from this said new function, the value of speed V expressed in Mach of the mobile body relative to the ambient air mass.

Advantageously, the speed V of the mobile body relative to the ambient airflow is determined from values of static and dynamic pressures, and the angle of attack of the fin ALPHA of the velocimeter, and this in a univocal manner defined in the direction (PS−PB)/PS to V in the subsonic and transonic entire domain.

Alternatively, said method comprises the following steps:
The static pressure PS is measured,
Depending on the measured value of static pressure, a law linking univocally in the direction PB to V, the dynamic pressure tap PB to the speed V is selected,
Is applied to said law a correction factor depending on the angle of attack ALPHA of the fin,
dynamic pressure tap PB is measured
The value of the speed V of the mobile body relative to the air mass is determined by using said measurement of the dynamic pressure in said law.

BRIEF DESCRIPTION OF THE DRAWINGS

The invention will be better understood and other advantages will appear on reading the detailed description of embodiments given by way of non-limiting examples with reference to the accompanying drawings in which:

FIGS. 1a to 1e show several embodiments of a fin profile according to the invention;

FIG. 9b shows a cross section of the KK of the fin according to the preferred and particular embodiment of FIG. 9a.

FIG. 9c is a sectional view of the section of the rear portion of the fin (1) according to FIG. 9a.

DETAILED DESCRIPTION

Figure 2A:
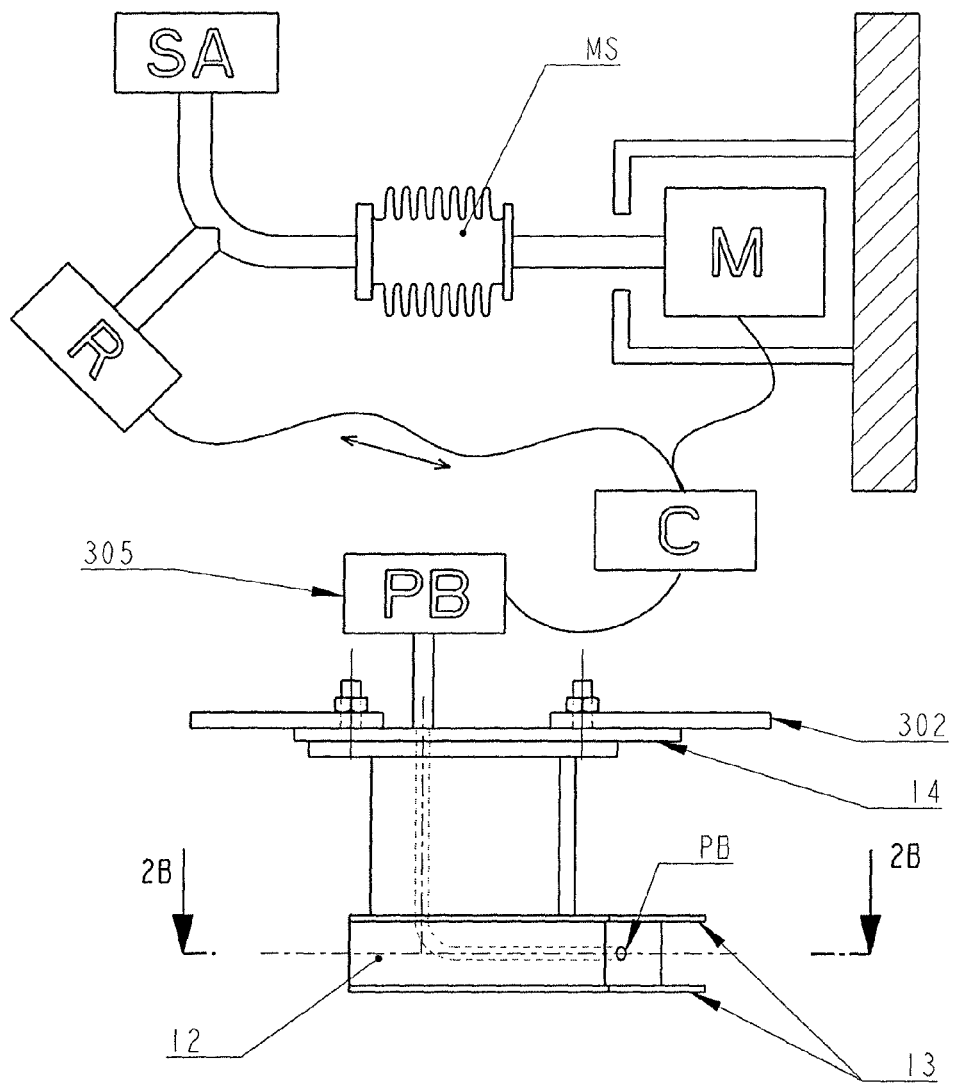
FIGS. 2a and 2b show two variations of fins according to the invention.

In all of FIGS. 1 to 4, the moving direction of the wind is shown by a sweep angle and the reference W.

The FIGS. 1a to 1e represent various embodiments of a fin profile according to the invention.

The fin (1) has an elongated shape. It is relatively thin, in order not to generate too much drag. This fin has a wingspan typically between 4 and 14 cm to be sure not to be in the existing "boundary layer" along the fuselage. It is preferably placed in front of the fuselage of the aircraft, where the boundary layer is not very thick, preferably very small. Indeed, these features reduce induced drag by the lift without increasing the size of the fin (1). In transonic as subsonic speeds, the lift of a fin is proportional to the airflow around it.

These figures illustrate the portions A and B of the fin (1) and the dynamic pressure tap PB tap located in the portion B of the fin (1), said portion B constituting the rear part of the fin (1). The portion A, which corresponds to the leading edge of the fin, does not comprise any pressure tap and has an increasing thickness in the direction of the portion B. Not having any pressure taps on portion A overcomes pressure measurement errors due to the angle of attack and/or drag, and/or boundary layer. Therefore, static and dynamic pressure measurements are not flawed and speed measurement system according to the invention can thus overcome problems related to icing and heavy rain, for example ice and water accumulation close to dynamic pressure tap PB. Indeed, for example for a positive angle of attack, the airflow around the fin can create higher speeds on the extrados et lower speeds on the intrados that leads to a higher pressure on the intrados than on the extrados, therefore creating a lift directed upwards. This lifting force is generated by the fluid which is expelled downwardly due to the particular shape of the fin and the angle of attack. In this way, the profile of the fin is adapted to avoid excessive drag.

The advantage of measuring a dynamic pressure is characterized in that the calculating means configured to derive the speed V of the mobile body relative to the mass of ambient air (for a Pitot tube the calculating means is a pressure gauge) measures the pressure difference between the static pressure and the dynamic pressure and can therefore readily calculate the flow velocity of the fluid around the fin. This speed corresponds to the relative wind and is in aviation, one of the primary factors of importance to the pilot, who must always maintain its vehicle above its stalling speed and below its maximum speed. Knowing the shape of the function relating the velocity and pressure for an angle of attack and/or a sideslip angle, it allows in addition deducing the ground speed and consumption of the aircraft.

The profile of the fin (1) is defined by a wingspan axis ZZ' and a set of coordinate points X and Y forming the profile of the fin (1) in each place of the spanwise axis ZZ', this set of points being defined by a function Y=G (X) where the axis OX of X is defined substantially along the longitudinal axis of the profile of the fin (1) and wherein the OY axis of Y is perpendicular to the axis OX of X.

The portion B is a portion of the fin (1) located at the rear of the portion A with respect to the moving direction of the fin in an air mass, said portion B has a decreasing thickness. According to a particular embodiment, the portion B corresponds to a portion of the fin (1), wherein the absolute value of Y decreases as a function of X on the intrados or on the extrados of the fin; and is then a portion whose thickness decreases while going away from the portion A This portion B is the rear of the fin (1), as opposed to the edge formed by the portion A.

We can clearly see the effect of this succession of portions A and B. The A portion is the portion facing the fluid flow. The fin is relatively thin, it has a wedge shape, the leading edge of the wedge is a sharp angle (8) of about 2 mm radius. Thus the suspended particles can easily enter in contact with the fin (1) on the said portion A at the leading edge. Due to the increasing cross section area of the said portion A, these particles will be guided by the leading edge of the fin so as to keep them away from the axis OX of the fin (1). At the point of transition between the portion A and the portion B of the fin (1) forming the sharp edge (2), these particles are channeled close to the dynamic pressure tap PB in the rear part of portion B.

More generally, the portion B has an abrupt break of slope from the portion A on the intrados and/or extrados of the wing.

In the embodiment shown in the FIG. 1a, the portions A and B are defined by straight line segments, thereby defining an edge of the fin at the connection between these two portions. This edge defines a sharp angle (2) of about 2 mm separating the portion A to the portion B, said sharp angle (2) enabling the stabilization of the shock wave in transonic speed. In this way, it is possible to avoid parasitic or variation or dynamic pressure measurement errors taken in the rear portion of the portion B.

The angle between the segment defining the portion B and the Y vertical axis is defined as shown by a TETA angle whose value is typically in the range of 0 to 70 degrees, typically equal to 30 degrees or 45 degrees. The angle between the segment defining the horizontal portion A and the OX axis is defined by an angle BETA, the value of which is typically between 5 and 30 degrees, preferably less than 30 degrees, locally at the connection between the A portion and the portion B. It is possible to achieve a negative angle TETA for example equal to −10 degrees.

According to a particular embodiment of the fin shown in FIG. 1a, we have the following values of angles: BETA=5 degrees and TETA=30 degrees. More generally, the value of BETA is advantageously greater than 4° and the TETA value is preferably less than 60 degrees, so as to define an abrupt break of slope between the portions A and B. Angles BETA and TETA are provided in FIGS. 1b to 1e as well, for which the same orders of magnitude are applied.

FIG. 1b shows an embodiment wherein the portion A has a rounded leading edge, while the portion B forms a tapered portion on the intrados or on the extrados of the wing.

FIG. 1c shows a variant of the FIG. 1a, wherein the B portion is concave, and presents two portions of which the contour is defined by a circular arc of radius h from the connecting portion with the portion A.

FIG. 1d shows another variant, wherein the B portion is convex and has a substantially semicircular shape having a radius h and whose center is situated on the OX axis, from the connection with the portion A.

The FIG. 1e shows a variant of the FIG. 1b, wherein the B portion has a rounded contour on the upper surface or lower surface of the fin, and forms a rim for protecting the portion of the inclined portion B from projections, especially when the aircraft is parked on parking lot.

Alternatively, the portion B is substantially transverse to the axis OX, the fin (1) having a triangular section while, typically an isosceles triangle. The length of the portion B on the OX axis is then zero. Dynamic pressure tap PB is here situated at the rear of the fin relative to the direction of movement of the fin in the air mass.

In each of the illustrated embodiments, the portion A corresponds to a portion A of the profile where the absolute value of Y is increasing with X, that is to say the leading edge of the fin (1), in order to push away the water or dust particles present in the mass of ambient air outside of the profile.

The lengths along the X axis of the portions A and B typically have a ratio greater than or equal to one, typically between 1:1 and 10:1, that is to say by designating the length of the portion A measured on the X axis by LAX and by designating the length of the portion B measured on the X axis by LBX, typically the following relationship is: LBX≤LAX, or typically LBX≤LAX≤20 LBX. Therefore, the turbulence produced by the fluid flow is not likely to disturb the pressure measurements in the rear portion of the fin. According to a particular embodiment of the fin (1) LAX=76 mm and LBX=8 mm. The Y value typically varies between +h1 and h2, where h1 and h2 are typically between 4 and 20 mm, for example equal to 8 mm.

Dynamic pressure tap PB is typically disposed at a distance of the OX axis substantially equal to 3 h/4, on the portion B of the fin (1), preferably on its underside or on the upper surface thereof.

Figure 2B:
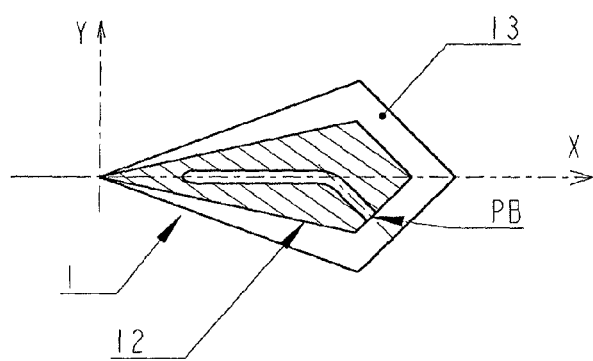

FIGS. 2a and 2b show a variant of a system according to the speed measurement pursuant to the invention, where FIG. 2b is a sectional view of FIG. 2a according to the drawing 2b-2b defined in FIG. 2a. The fin (1) as shown includes an intermediate segment, a measuring segment (12) comprising elements projecting structure (13), and connecting means (14) adapted to allow fixing of the fin (1) for example on an aircraft fuselage. The intermediate segment is disposed between the connecting means (14) and the measuring section (12), and allows shifting of the measuring segment (12) of the aircraft fuselage.

The salient elements of structure (13) are typically ribs disposed substantially perpendicular to a wingspan axis of the fin and extending at least in the portion B of the fin. These projection structure elements (13) are adapted to channel the airflow near the dynamic pressure tap PB and therefore to avoid formation of added turbulence that could disturb measurement of dynamic pressure tap PB.

In this embodiment, the dynamic pressure tap PB measured by the velocimeter is converted into an equivalent pressure to the one delivered by a Pitot tube under the same conditions The measured pressure tap PB is converted into a digital value, and is given as an instruction to a motor M via a computer C. The motor M activates a bellows MS as a function of this instruction, which delivers a pressure to the aircraft system SA.

A pressure tap R provides a feedback loop between the pressure delivered by the bellows MS and the computer C, thereby enabling to adjust the instruction given by the computer C to the motor M. This embodiment makes it possible to adapt a velocimeter according to the invention, without requiring modifications of existing aircraft system SA.

Figure 3:
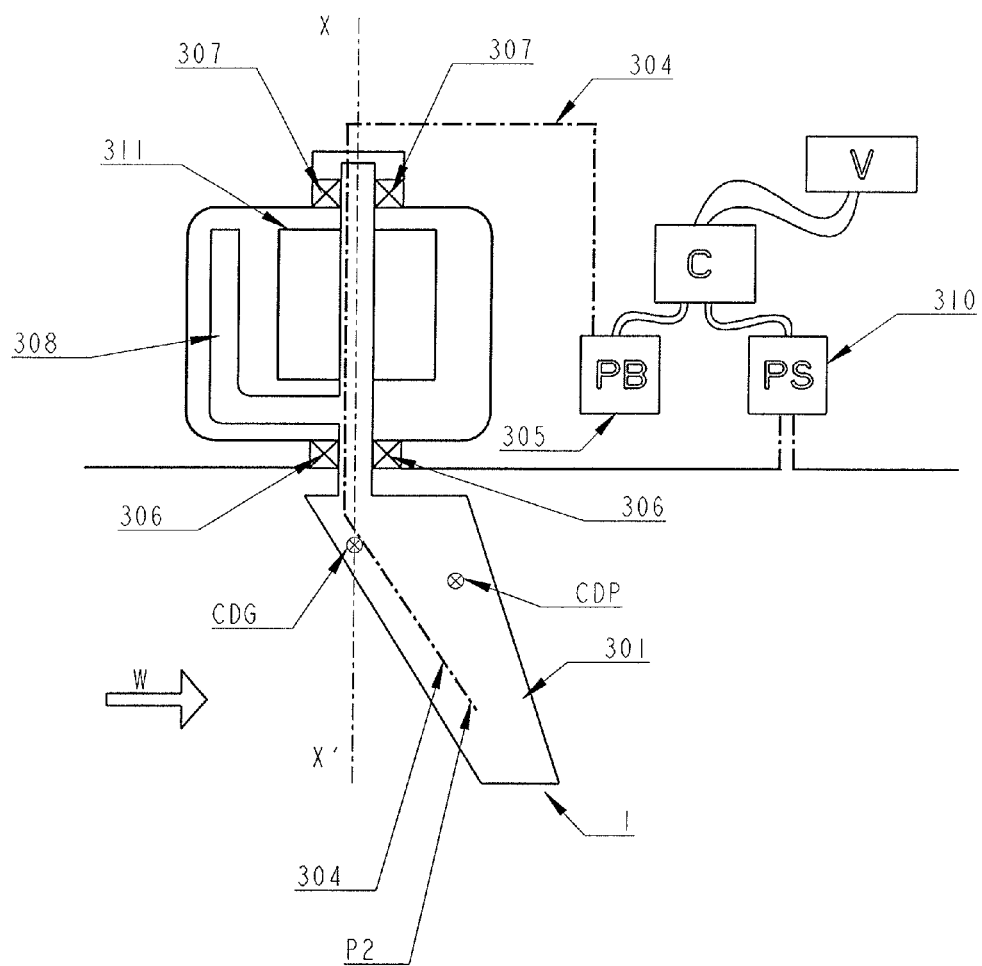
FIG. 3 shows an embodiment wherein a flange is rotatably mounted about an axis.

FIG. 3 shows one embodiment of a speed measurement system according to the invention wherein a fin is mounted rotatably about an axis XX' relative to the body of the moving object within the fluid, typically an aircraft fuselage.

In this embodiment, a fin (301) is placed in a fluid, typically air containing liquid particles and solid particles (water, snow, ice, sand or insects, for example). When the aircraft is flying, its movement relative to the mass of air creates a relative wind which is the direction of movement indicated by the sweep angle W.

The fin is here mounted on the fuselage of the aircraft, but it could also be mounted beneath the wing. This fin is mounted movable on the aircraft fuselage (302) and is fixed to a shaft which is rotatable about an axis XX'. Here two ball bearings (306) and (307) hold the fixed fin in translation along two axes and rotation of the fin, but leaves the fin free to rotate about the axis XX. A weight (308) balances the fin so that the center of gravity CDG of the assembly constituted by the fin elements and the ones which are jointly attached is located substantially on the axis XX'. Here the center of gravity CDG is located near the fuselage in order that the application of a load factor does not create any significant moment on the fuselage and therefore gives to the assembly a high stability under load factor. This position of the center of gravity is crucial because it ensures that under a load factor, the fin does not tend to increase its angle of attack and thereby distort the measurements. Indeed the lift coefficients vary with the angle of attack of the fin relative to the wind.

Here the fin has sweep angle of about 30 degrees, so that the center of pressure of the fin CDP is placed behind the center of gravity CDG to provide natural stability of the fin.

A dynamic pressure tap PB is constituted by a hole placed on the lower surface of the fin. This pressure tap is located at the rear of maximum thickness of the airfoil, after the leading edge. This pressure tap is located in the B portion of the fin (301). It is noted that, as previously in FIG. 1, no control pressure tap is disposed in the portion A corresponding to the leading edge of the fin. A seal tight first channel (304) conveys the dynamic pressure tap PB to a pressure sensor (305) for generating an electrical signal corresponding to this dynamic pressure tap PB.

A static pressure tap PS indicated by the reference (309) is placed on the fuselage (302) and communicates through a sealed pipe to a pressure sensor (310). This pressure tap can also be disposed on the fin (301), the collecting means measuring the static pressure are well known to those skilled in the art, for example by collecting the pressure at a point where the pressure varies very slightly with velocity V. A rotation sensor (311) measures the rotation of the fin and therefore its angle of attack ALFA in relation with the wind. It is then possible to know the absolute value of the speed but also the angle of attack of the relative wind. This information can be transmitted to the pilot to indicate for example an imminent stall.

The pressure sensors (310) and (305) and the rotation sensor (311) transmit electrical signals to a computer C in which, as a function of the values of the static pressure PS, of the dynamic pressure tap PB and for a angle of attack ALPHA and/or a sideslip angle GAMMA, deducts the value of the airspeed V pursuant to a predetermined function F of the form F (V)=(PS−PB)/PS, univocal in the sense of (PS−PB)/PS to V, strictly increasing in all subsonic and transonic domain.

Figure 4:
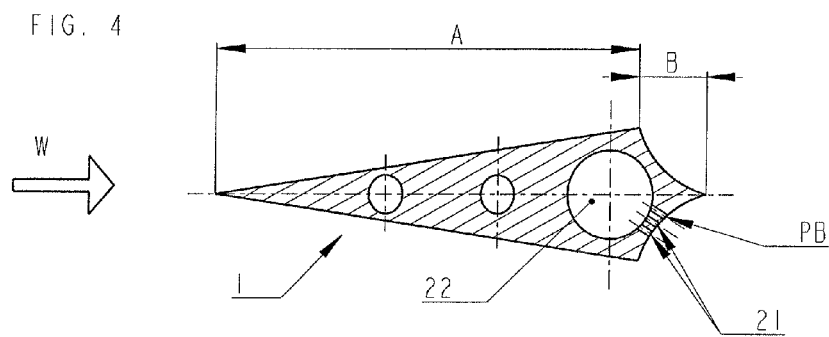
FIG. 4 shows another embodiment of fin according to the invention.

FIG. 4 shows a sectional view of another variant of the fin (1) according to the invention, wherein the dynamic pressure tap PB comprises a plurality of orifices (21) which are arranged on the rear portion the fin (1), preferably on the lower surface of the fin, in the B portion constituting the rear part of the wing (1), and which open into a plenum chamber

(22) formed in the body of the fin (1). Two heating means (10) are used to regulate the temperature to avoid risk of icing.

This FIG. 4 shows a general form similar to that shown in FIG. 1c, wherein the radius of the two portions of circles defining the portion B is typically equal to 30 mm and the value of h is substantially equal to 8 mm and the sharp angles (2) and (8) typically have a radius of about 2 mm. These dimensional parameters for this fin type are needed to avoid excessive drag and interference measurements caused by the boundary layer. The plenum chamber (22) provides a stable pressure, of which the noise sensitivity is reduced compared to a conventional pressure tap having a single pressure port without a plenum chamber.

Figure 5:
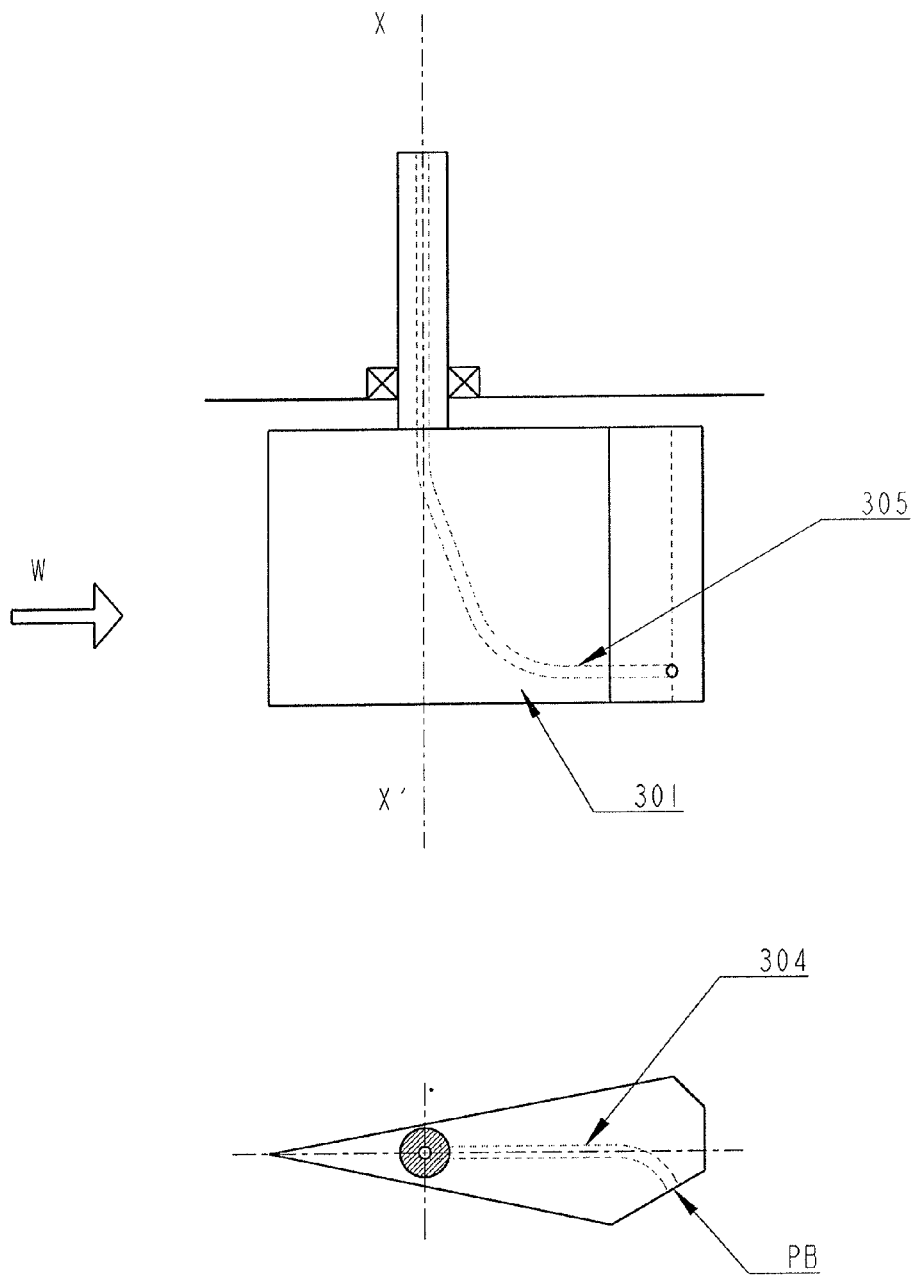
FIG. 5 shows an alternative embodiment in which a fin according to the invention is rotatably mounted about an axis on the fuselage of an aircraft.

FIG. 5 shows a variant of the speed measurement system presented in FIG. 3, wherein the fin (1) is wedge-shaped, and is rotatably mounted about an axis XX'. This wedge shape is necessary to channel the fluid on the intrados and the extrados, with a ratio of 50 percent in order to balance the lift on both sides of the fin.

Figure 6:
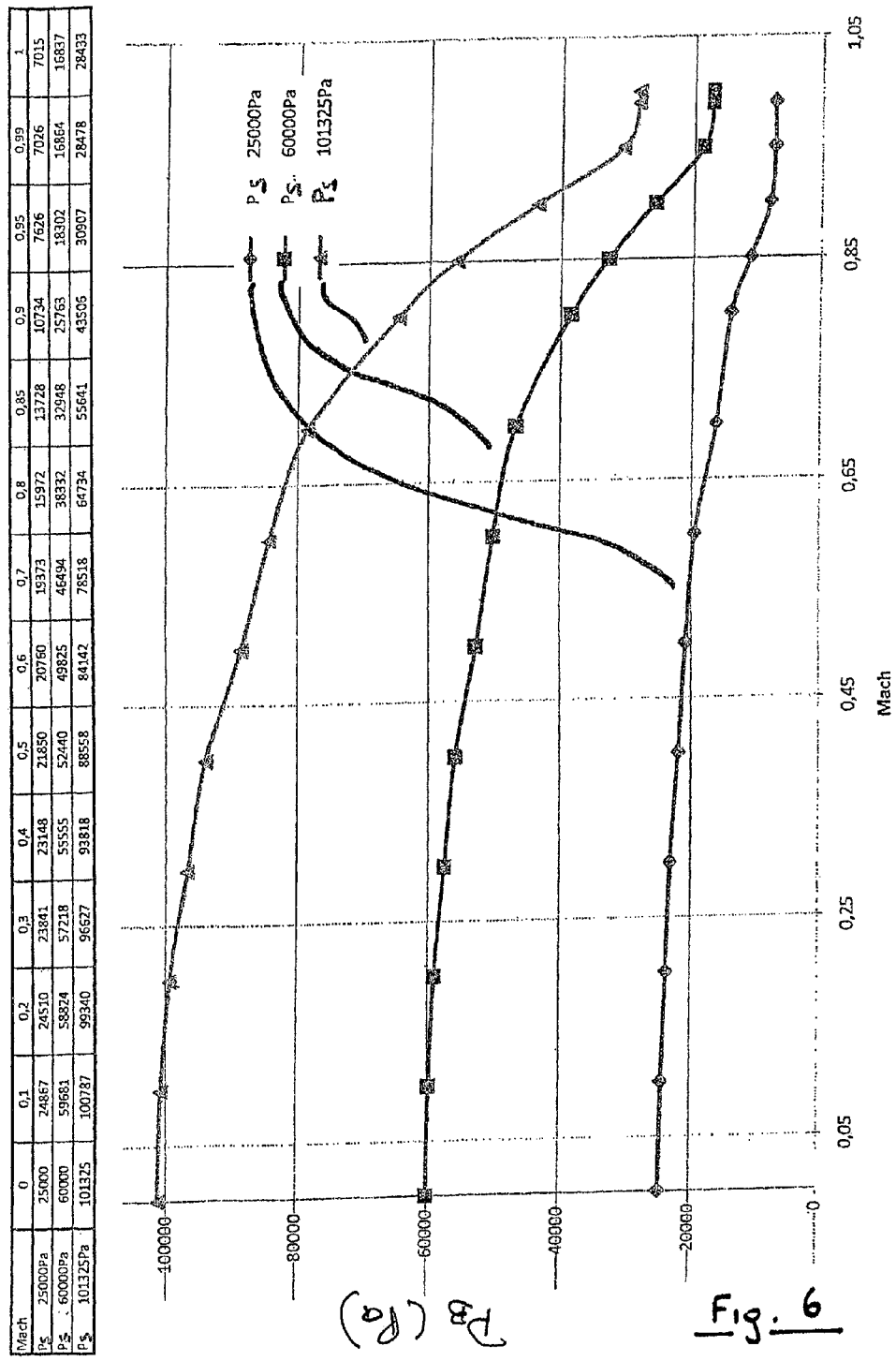
FIGS. 6, 7a and 7b show curves of variation of the function F (V) for deriving the speed V of the mobile body in the subsonic and transonic domain regardless of weather conditions for a fin according to the invention.

FIG. 6 shows an example of the law F having the form PB=F(V) for a fin having a profile according to the invention as shown in FIG. 1a to 1e. This figure shows three curves corresponding to three different values of static pressure or atmospheric PS and a table of values corresponding to these curves. This figure shows the evolution of the pressure as a function of the speed or as a function of Mach. It is observed that the curves are univocal throughout the range of speed between Mach 0 and Mach 1 that is to say that to a pressure value does correspond to a unique value of speed.

From the values of static pressure PS and dynamic and dynamic pressure tap PB, for each value of the angle of attack angle ALPHA and optionally of sideslip angle GAMMA, a function F (V)=(PS−PB)/PS is defined in order to deduce the speed V in Mach of the mobile body.

Figure 7A:
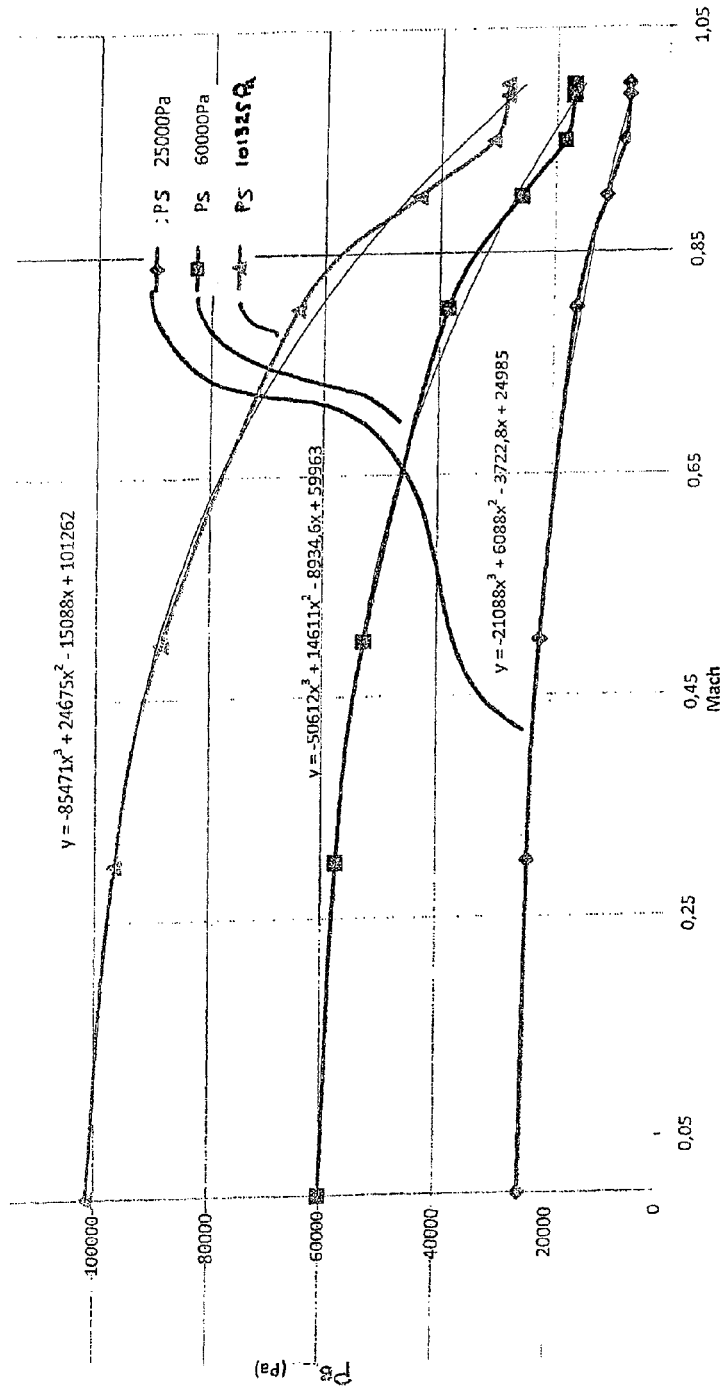
Figure 7B:
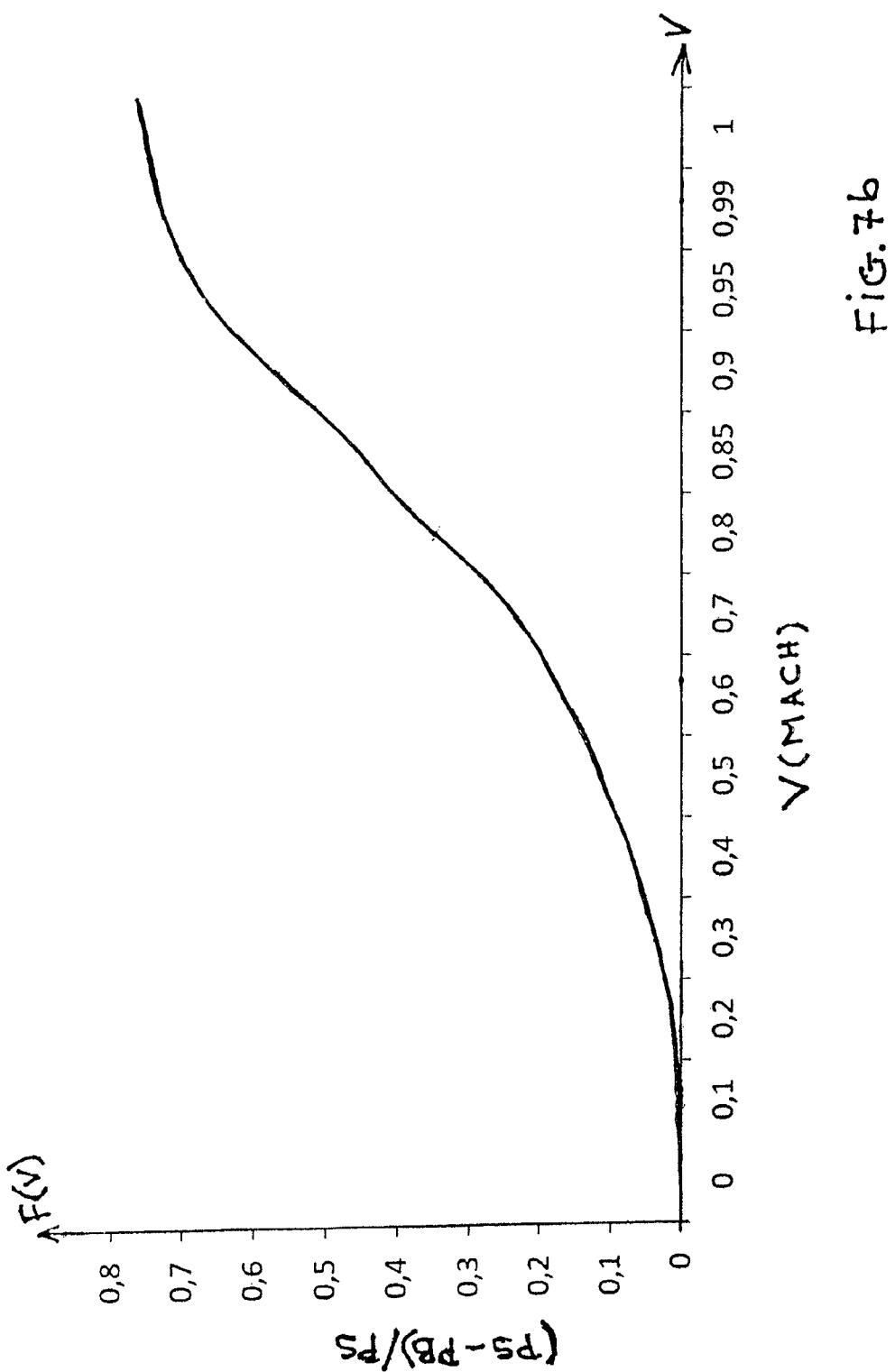

The function F (V)=f(PS−PB)/PS thus obtained, as shown in FIG. 7b, for each value of the angle of attack angle of the ALPHA and optionally slip angle GAMMA is univocal in the sense of (PS−PB)/PS to V, strictly increasing as a function of Mach number throughout the all flight envelope of the aircraft, at subsonic or transonic speed. The said function may have in some cases, at least one inflection point for a value of Mach number comprised between 0.3 and 0.5 or 0.95. It may be approximated or smoothed by a polynomial function of degree at least equal to 2.

FIG. 7a is similar to FIG. 6. It also provides functions to approximate the curves of pressure as a function of the speed V of the mobile body. The functions illustrated allow approximating the pressure curves in function of the speed for the entire subsonic and transonic domain (Mach 0 to Mach 1) for each value of the angle of attack and ALPHA and/or optionally aircraft sideslip angle GAMMA. The functions PB=F(V) presented are polynomial functions of degree at least equal to 3 for a given static pressure:

For a static or atmospheric pressure PS equal to 101325 Pa, $$y=-85471x^3+24675x^2-15088x+101262;$$

For a static or atmospheric pressure PS equal to 60000 Pa, $$y=-50612x^3+14611x^2-8934.6x+59963;$$

For a static or atmospheric pressure PS equal to 25000 Pa, $$y=-21088x^3+6088x^2-3722.8x+24985.$$

where y is the dynamic pressure tap PB and x is the Mach number.

FIG. 7b shows the graph of the function F(V)=(PS−PB)/PS. It is noted that independently of the static pressure PS, said function F (V) enabling to deduce the speed V of the mobile body is unique. This function is univocal, or in some cases bi-vocal strictly increasing throughout the subsonic and transonic domain. It can also be approximated by a strictly increasing univocal or bi-univocal polynomial function of degree at least equal to two in the subsonic and transonic domain, preferably at least equal to three. We also note the presence of a single point of inflection required for univocal or bi-vocal behavior and the injectivity of said function F (V)=(PS−PB)/PS.

Said FIGS. 6, 7a and 7b have been validated by numerical simulations and wind tunnel tests. These two methods give consistent results and highlight the added benefit of a fin according to the invention. However, flight tests must be performed for each type of aircraft, possibly for each value of the angle of attack ALPHA and/or possibly slip angle GAMMA to establish more precisely the functions that must be used to obtain an accurate and reliable speed throughout the range of subsonic and transonic flight, regardless of icing and heavy rains taking into account the correction that would follow aircraft sideslip angle GAMMA and/or angle of attack ALPHA.

Function F(V)=(PS−PB)/PS obtained and/or function obtained by polynomial approximation here enable to establish a necessary theoretical model to determine or to deduct mobile body speed relative to mass of ambient air (7).

Figure 8:
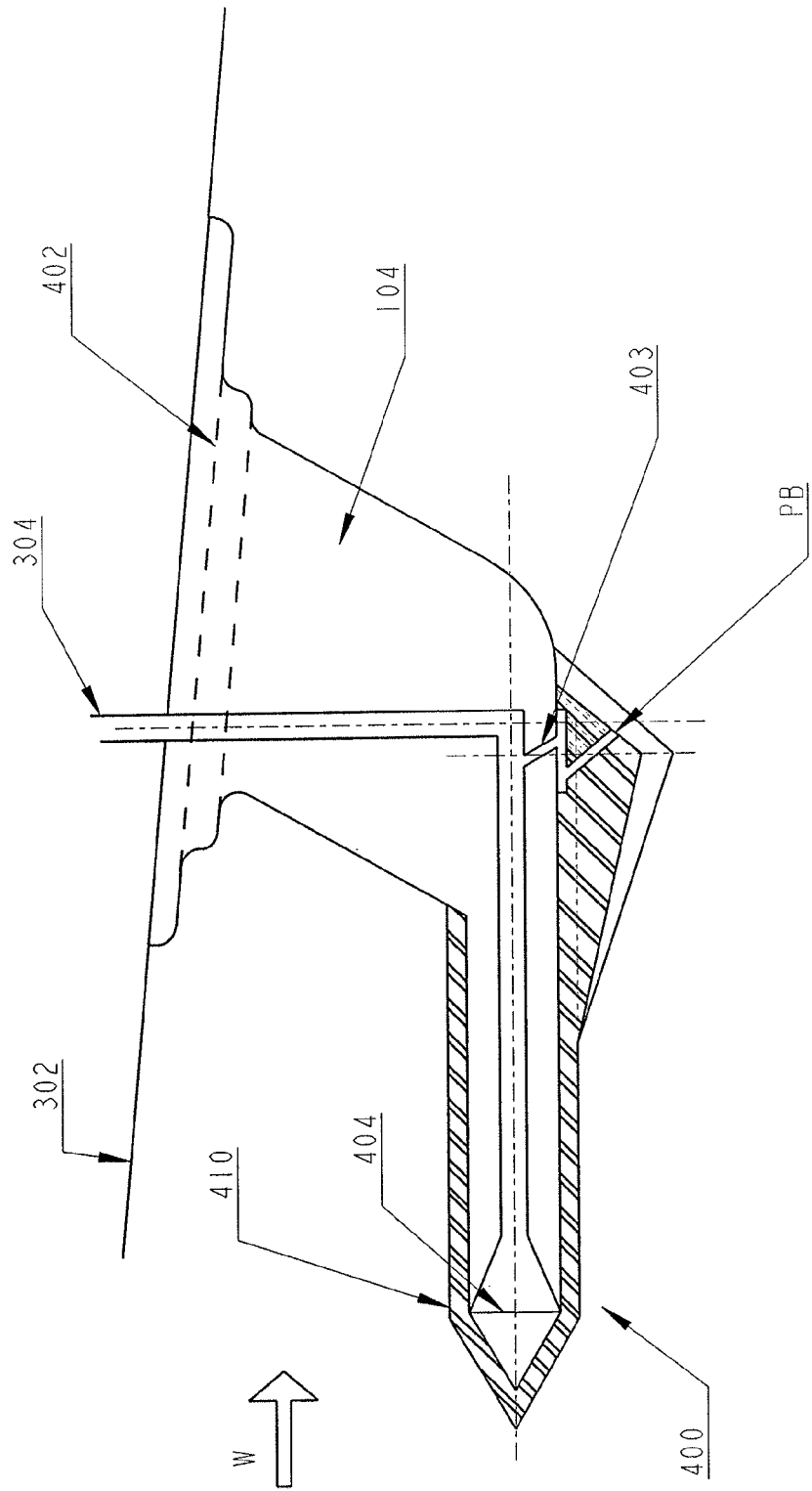
FIG. 8 shows a variant of a velocimeter according to one aspect of the invention.

FIG. 8 shows another embodiment of a velocimeter according to the invention, realized by using an existing Pitot tube (400) mounted to the fuselage (302) of an aircraft for example. In this embodiment, the existing Pitot tube (400) is connected to the fuselage (302) by means of a mast (401) and a base (402), and is equipped with a plug (410) closing off its front air intake (404), but leaving free its drain (403) which is used as a pressure tap PB. We understand that the plug (410) may also have a channel opening into the front air inlet (404) of the Pitot tube (400), and leading to a pressure tap PB in the B portion of the plug (410). More generally, the plug (410) comprises a channel having an air intake in its portion B similar to the velocity meters shown in the previous figures, and the inner conduit opening into the Pitot tube (400) so as to convey the aircraft dynamic pressure system or a converter or computer via a channel (304). The plug (410) has a suitable shape so that the assembly formed by the Pitot tube (400) and the plug (410) has a shape similar to the shape of the various embodiments shown in FIGS. 1a to 1e, that is to say with a portion A forming a leading edge having an increasing thickness along the longitudinal axis of the fin, and a rear portion B, having a decreasing thickness along the longitudinal axis of the fin. This particular embodiment thus provides a velocimeter according to the invention, using the Pitot probes already equipping aircraft for example. The plug (410) is typically of metal to be heat conductive to ensure the defrost function, and is associated with means of attachment to ensure its retention in position on the Pitot tube (400). Speed measurement system according to one aspect of the invention uses the polynomial laws defined above, linking the moving speed of the mobile body with respect to an air mass as a function of the dynamic pressure and the static pressure for each value of angle of attack ALPHA and/or the sideslip angle GAMMA. For example, the device detects the measured static pressure value PS, and then determines which law is applicable. Then, depending on the angle of attack of the fin and/or the sideslip angle, a correction factor is applied to the applicable law. Finally, depending on the value of measured dynamic pressure tap PB, the relative speed of the mobile body is determined, for example, by entering on the corrected law the value of dynamic pressure thus measured.

According to an advantageous embodiment, a stabilizing system prevents the fin from vibrating, while leaving it free to align itself in the direction of the wind.

Preferably, the fin is provided with heating means to prevent the deposit of ice on the surface of the fin which could block or obstruct the pressure tap.

Figure 9A:
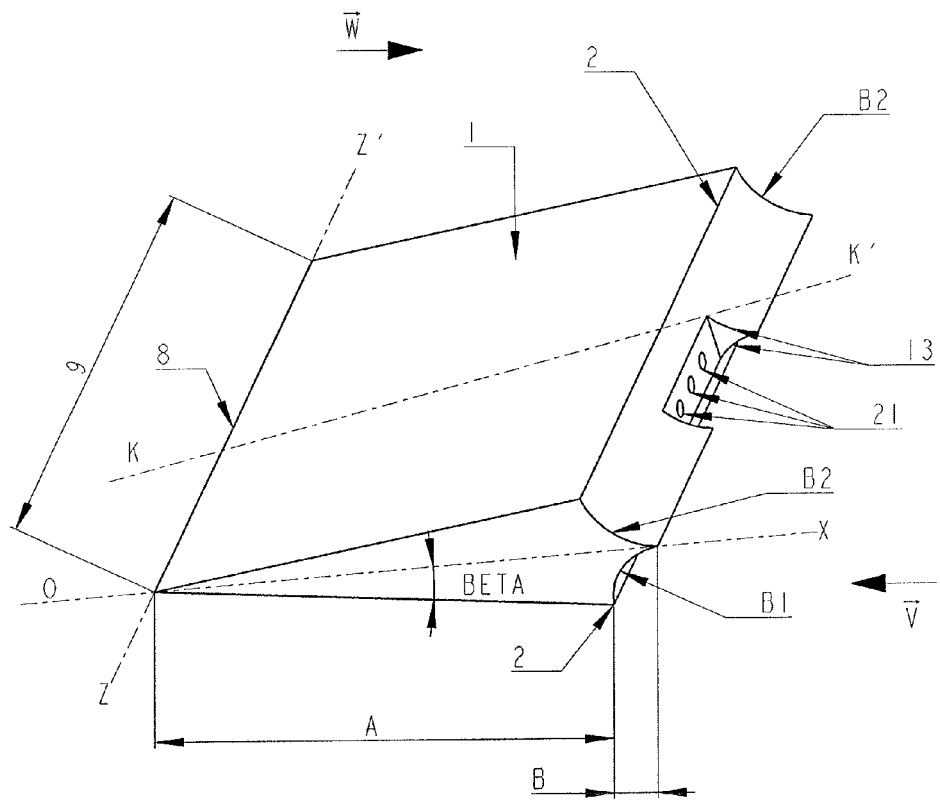
FIG. 9a is a schematic sectional view of a preferred and particular embodiment of the object of the present invention apparatus pursuant to FIG. 1c.

FIG. 9a is a schematic sectional view of a preferred and particular embodiment of the device object of the present invention according to FIG. 1c. This FIG. 9a shows that a relatively thin fin (1) and having a wedge shape in its front part (portion A). The leading edge of the corner is a sharp angle (8) of radius less than or at least equal to 5 mm, preferably a radius of about 5 mm. Therefore, the drag forces of the fluid at the leading edge of the fin (1) are very small or negligible and the fluid flow is directed and/or oriented in a balanced manner, along the portion A at the lower and upper surfaces, which improves the lift/drag ratio.

Figure 9B:
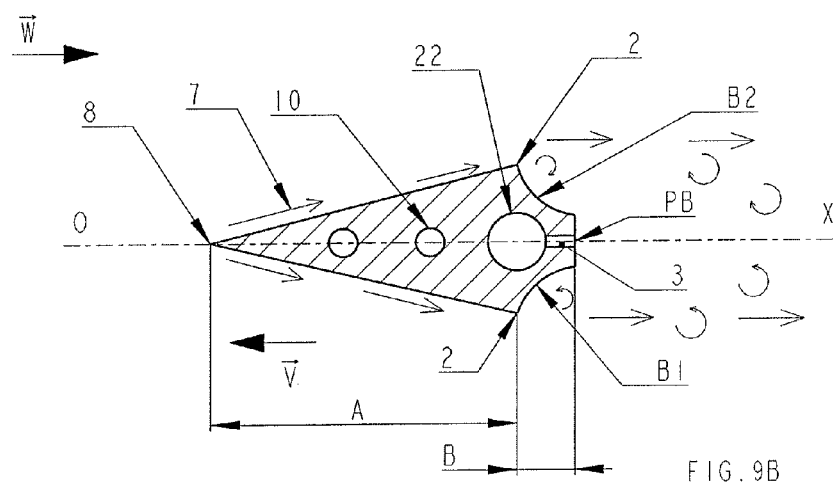
Figure 9C:
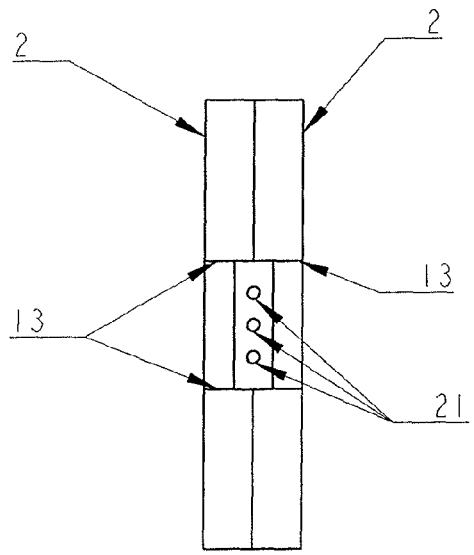
Figure 9D:
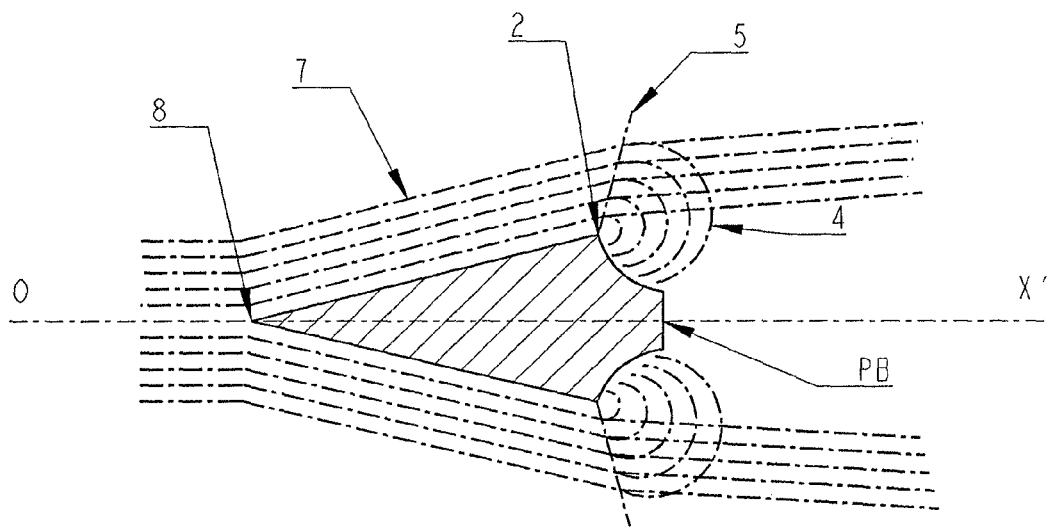
FIG. 9d shows a cross section KK of the fin according to the embodiment of FIG. 9a showing the field lines of the fluid flow around the fin.

At the end of portion A of the fin (1) vortices lines appear (4) which are consuming energy that cause a drag induced by the lift as shown in FIGS. 9b and 9d. In transonic speed a shock wave (5) is formed, which slows down abruptly the airflow as shown in FIG. 9d and modifies the path lines of the flow field (7) which modifies the flow field lines (6). This shock wave deviates significantly the flow near the zone of the pressure tap PB, on the back of the fin. This slowdown is related to a loss of energy generated by the wave drag. To resolve this issue, which can lead to errors in measurement of the speed of the mobile body, it is intended that the fin has double sharp edge form in its portion corresponding to the rear portion B. Said fin having a shape comprising at least partially a truncated bevelled portion and comprising two sharp edges (2) of radius less than 5 mm between the portion A of the portion B so that in transonic speed shock wave created by said level of the sharp edges (2) is stabilized and/or the path of field lines is changed to the rear of the wing, creating a vortex flow (4) in the rear part of the wing (1). The thickness of the portion A is increased in the direction of the portion B. This swirling flow (4) created in the rear part of the fin has a vortex shape or roll shape having an axis substantially parallel to the ZZ' axis and allows directing the fluid in the domain near the pressure tap PB at the back of the fin.

In this way, the fin (1) can stabilize the shock wave (5) in transonic speed and reduce drag induced by lift. Thus, the flow velocity drops sharply so that the normal component to the shock passes from supersonic to subsonic speed or transonic speed, which results in a new type of drag corresponding to the field from 0 to Mach 1.

The portion A of the fin forming the front portion of the fin does not include pressure tapping. Thus it is possible to prevent erroneous static pressure values, because in this portion A where the surface of the fin is increasing, a form drag is superimposed on the frictional drag and/or the wave.

The portion B, forming the rear part of the fin, comprises two zones B1 and/or B2 having a concave curved shape. These zones B1 and B2 create a swirling flow (4) in the rear portion of the fin for directing the flow in the region near the outlet domain pressure tap PB. The created vortex flow allows, through the centrifugal forces, to trap then to filter and/or eject and/or exclude particles having a greater density than the density of the air in the vicinity of the zone of pressure tap PB at the back of the fin. Said zones B1 and B2 may also channel and/or stabilize the path of the airflow to the rear of the wing, more particularly close to the intake zone of pressure tap PB. In this way, the fin is less sensitive to heavy icing conditions and cannot be hit hard by the particles having a density greater than the density of the air, such as ice particles.

An alternative embodiment is characterized in that the portion B has a break in the slope relative to the portion A of the intrados and extrados of the fin. The portions A and B are defined by rectilinear segments, defining an edge of the fin at the connection between these two portions. In this way, form drag may be controlled by preventing the entire drag is greater than the lift.

Another embodiment is characterized in that the portion B, forming the rear part of the fin, comprises two curved convex zones B1 and/or B2.

The vector W represents the direction of the fluid and the direction vector V represents the velocity of the moving structure relative to the fluid.

The ratio of the length of the portion B to portion A is greater than 0.3 and the angle BETA is smaller than 20 degrees so that the length of the boundary layer existing along the fin is very low, preferably negligible. This is one reason for designing a fin (1) of substantially thin shape.

Dynamic pressure tap PB comprises three openings (21) of diameter not exceeding 5 mm, placed in the rear portion of the portion B of the fin (1). The advantage of having several pressure tap holes of at least 5 mm lies in that it allows channeling or directing a large flow of fluid in one room measuring pressure tap PB.

The arrangement of pressure tap holes (21) at the rear ensures to prevent that the fluid encounters frontally said holes (21), which allows the fin (1) to overcome exceptional weather conditions, such as problems related to icing and heavy rain, by avoiding accumulation of ice and water.

The fin (1) comprises ribs (13) disposed substantially perpendicular to a wingspan axis (ZZ') of the fin (1) and extending in the rear portion of the portion B of the fin. Said ribs are adapted to channel the airflow in the area near the pressure tap PB, particularly in the vicinity of dynamic pressure tap PB.

The fin has a small span (9) typically comprised between 3 and 14 cm, a length of the portion A on the axis OX lower or equal to 160 mm, preferably 70 mm, a length of the portion B on the OX axis less or equal to 30 mm, a height comprised between 4 and 10 mm, an angle BETA comprised between 3 and 10 degrees relative to the axis OX so that the effects of the boundary layer along of the fin are negligible. In this way, the form drag can be negligible.

The function $F(V)=(PS-PB)/PS$ for deriving the relative speed V of the mobile body relative to a mass of ambient air (7) independently of the atmospheric conditions is a univocal or bivocal function strictly increasing as a function of the Mach number, this throughout the subsonic and transonic domain for each value of the angle of attack ALPHA and optionally sideslip angle GAMMA.

An alternative embodiment is in that the said function $F(V)=(PS-PB)/PS$ has at least one inflection point value for a Mach number comprised between 0.3 and 0.95. The said function may in some cases be approximated by a polynomial function of degree at least equal to 2.

FIG. 9b shows a cross section KK of the fin (1) according to the previous embodiment. In this FIG. 9b, dynamic pressure tap PB comprises three openings (21) of section smaller than one square centimeter as shown in FIG. 9c. Each hole (21) is connected to a pressure tapping channel (3). The total volume of the three channels connected to the pressure tap orifices (21) is denoted Vc. Each pressure tap channel (3) is connected to the plenum (22) having a volume Vt. Said pressure inlet channels (3) and said plenum (22) are adapted to the particular dimensions of the fin (1) as defined above, so that the ratio of volume Vc of outlet channels pressure (3) to the volume Vt of the plenum chamber (22) is less than 0.1, so that said plenum chamber can filter rapid pressure variations induced by the air turbulence and/or thermodynamics of portion B. In this way, the dynamic pressure measured is not degraded by errors induced by the surrounding turbulence nor by said turbulence.

The fin comprises heating means (10) and temperature control means which can avoid any risk of icing. These heating means are constituted by at least two cylindrical heating probes (10) of at least 2 mm in diameter and 30-80 mm in length. Said probes (10) are mounted in series or shunt electrically. Said heating means are a cylindrical rod or filaments made of an alloy of Iron-Nickel, heated by Joule effect between 50 and 500 watts. The advantage of using this iron-Nickel alloy lies in that this alloy has a low thermal expansion and can be used in a complex medium and in a temperature range of 0 to 750° C. Said temperature probes are adjusted to avoid problems of oxidation of iron components.

FIG. 9c shows a sectional view of the rear portion of the fin (1) according to FIG. 9a. This figure shows the ribs (13) for channeling the flow in the vicinity of pressure taps PB (21) for measuring dynamic pressure and the two sharp edges (2) necessary to stabilize the shock wave in transonic speed.

FIG. 9d shows a cross section KK of the fin (1) according to FIG. 9a. It is clear that the field lines of the fluid are channeled into the vicinity of pressure tap PB, preferably close to pressure tap PB. The leading edge of the component sharp edge (8) is thin and does not comprise a pressure tap. Thus, the fluid does not hit with full force the dynamic pressure tap.

Before reaching the leading edge of the fin constituting the sharp angle (8), the field lines of the fluid flow (7) are parallel to the axis OX. After the leading edge, the field lines of the flow follow the structure of the portion A, going away from the axis OX. At the end of the portion A, in transonic speed, a shock wave (5) modifies the direction of the field lines (6) of the fluid flow away from the structure of the fin strongly by changing the path of field lines (7). Sharp edges (2) separating the portion A and the portion B, stabilize this shock wave (5) and/or alter the line fields path (6) in the rear part of the fin. Thus, a swirling flow (4) occurs after the sharp angles (2). The curved shapes of zones B1 and B2 constituting the portion B direct the swirling flow (4) close to the rear part of the fin, near the pressure tap PB. This creates a centrifugal force to trap the particles in the swirling fluid flow (4) so as to separate the particles of greater density than the density of the air close to the pressure tap PB zone. These particles of density greater than the density of the air are ejected under the effect of centrifugal forces away from pressure tap PB zone and low density particles are stabilized and channeled to the rear of the fin, close to the pressure tap PB. The swirling flow (4) has a roller-shaped and/or a vortex shape having an axis substantially parallel to the axis ZZ'. In this way, this multi-physical system, particularly the speed measurement system pursuant to the invention avoids all problems related with icing or important pressure.

Figure 10:
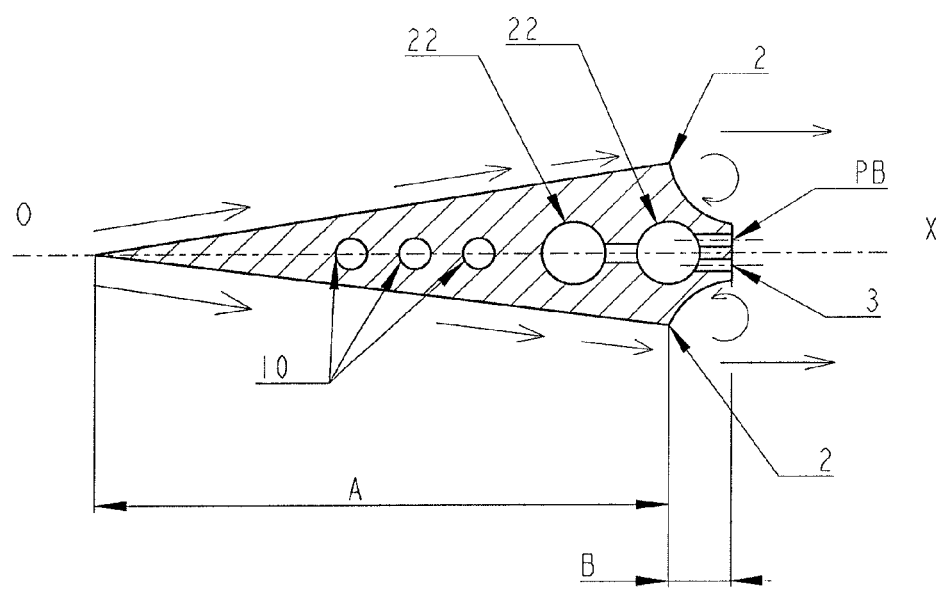
FIG. 10 shows a cross section KK of the fin corresponding to another preferred embodiment of the device object of the present invention according to FIG. 1c.

FIG. 10 shows a cross section KK of the fin (1) corresponding to a particular and preferred embodiment of the subject matter of the present invention. This FIG. 10 shows two plenum chambers (22) and three heating means (10). Therefore, it is possible to filter sufficiently the pressure variations noise and to maintain the fin at a sufficient temperature in exceptional weather conditions.

According to one advantageous embodiment, said system also allows speed measurement measuring two static pressures PS1 and PS2 respectively located at the right and the left of the fuselage so that the calculating means configured to determine the velocity V of the mobile body relative to the Mach value takes into account the pressure difference PS1 and PS2 as a function of aircraft sideslip angle.

The method for determining the relative speed V of the mobile body relative to a mass of air (7) by means of a multi-physical measuring system, particularly a speed measurement system pursuant to the invention consists to determine the speed V expressed in Mach of mobile body, relative to the ambient air stream, from values of static and dynamic pressure values measured for each value of the angle of attack angle ALPHA and optionally of the aircraft sideslip angle GAMMA, this univocally in the direction of (PS−PB)/PS to V, in the entire subsonic and transonic domain.

This method is defined by the following steps:
The static pressure PS is measured,
In case of slippage of the aircraft, two static pressure PS1 and PS2 are measured and static pressure PS corresponding to the average static pressures measured PS1 and PS2 is deduced,
Fin (1) dynamic pressure is measured,
For each value of the angle of attack ALPHA and/or the aircraft sideslip angle GAMMA the function F (V)= (PS−PB)/PS is selected univocally in the direction of (PS−PB)/PS to V, strictly increasing as a function of the Mach number,
A correction factor corresponding to said value of ALPHA angle of attack of the fin and/or the sideslip angle GAMMA is applied to said function,
A new function F(V)=(PS−PB)/PS adjusted for the influence of said angle of attack ALPHA and/or said slip angle GAMMA is obtained,
It is deduced from this new function the value of said speed V, preferably expressed in Mach, of the mobile body relative to the air mass (7).

According to an advantageous embodiment, the function F(V)=(PS−PB)/PS has at least one inflection point for a value of Mach number comprised between 0.5 and 0.90. This said function can also be approximated by a polynomial function.

It can be seen that it is therefore possible to realize in an industrial matter a device to determine the relative velocity of a fluid relative to a structure regardless of particles that may be present in this fluid, without the risk to see this device being partially or completely occluding providing that the pressure taps are located on the intrados or on the rear part of the fin. In particular, it is therefore possible to produce industrially a device that can deduct the relative velocity of an aircraft relative to the air mass (and also the angle of attack of the plane) throughout the flight envelope of modern aircraft, preferably independently of the presence or absence of solids or liquids such as frost, heavy rains or the presence of insects or sand for example.

Also, it can be seen that it is possible to realize a measurement system for measuring multi-physical aerodynamic parameters and/or thermodynamic parameters of a mobile body with respect to a flow.

The invention solves the above problems by proposing a device consisting of a speed measurement system measuring the relative velocity V of a mobile body relative to an ambient air mass (7) regardless of weather conditions, the mobile body being adapted to move at least at subsonic and transonic speeds, the said speed measurement system comprising:
- an elongated fin disposed in the ambient air mass (7), said fin having a longitudinal axis OX, a wingspan axis ZZ', comprising:
  - a portion A and a portion B, said portion A having a thickness increasing in the direction of B and forming the leading edge of the fin, said portion B, having a decreasing thickness, being located at the rear of portion A and forming the back of the fin,
  - at least one heating means (10) defined to avoid any risk of icing,
  - at least one dynamic pressure tap PB located in the B portion,
  - an angle BETA defined between the axis OX and the intrados or the extrados of the A portion of the fin,
- at least one static pressure tap PS placed on the fuselage (302) or on the base of the fin,
- at least one means for measuring and/or calculating the angle of attack ALPHA of the fin and optionally at least one means for measuring and/or calculating the sideslip angle GAMMA of the aircraft,
- at least a calculating means configured to determine the speed V of the mobile body relative to the mass of ambient air (7) from the values of static pressure PS and dynamic pressure PB and possibly the angle of attack ALPHA of the fin and/or the sideslip angle GAMMA.

It is advantageous that:
The fin is relatively thin and has a wedge shape at least in its front part (portion A), the leading edge of the wedge is a sharp angle (8) of radius less than or equal to 2 mm;
The fin has at least partially a tapered and truncated shape comprising at least one sharp edge (2) of radius less than at least 2 mm between the portion A of the portion B so that in transonic speed the wave shock (5) created at the said sharp angle (2) is stabilized and/or the path of field lines is modified at the aft of the fin;
The portion B, forming the aft part of the fin, comprises at least a zone having a circular shape convex or concave B1 and/or B2 to filter particles so that the particles of greater density than the density of the air, trapped in the fluid flow (4) to the aft of the fin, are ejected and/or spread out under the effect of centrifugal forces to the area near the pressure tap PB said B1 and/or B2 zone allowing to channel and/or to stabilize the path of the airflow to the aft of the fin, said fluid flow (4) having a roll-shaped and/or a vortex axis substantially parallel to the axis ZZ';
The fin comprises at least one rib (13) disposed substantially perpendicular to the span axis ZZ' of the fin and extending at least in the portion B of the fin, said rib being adapted to the channel airflow in a region close to the dynamic pressure tap PB located at the aft of the fin;
The function F (V)=(PS−PB)/PS enabling to deduct the relative speed V of a mobile structure with respect to a mass of ambient air (7) regardless of weather conditions, is a univocal function in the direction of (PS−PB)/PS to V, strictly increasing as a function of the speed V, preferably as a function of the Mach number, this in the entire subsonic and transonic domain for each value of the angle of attack ALPHA and/or optionally the sideslip angle GAMMA.

It is also advantageous that:
The portion B presents a sharp variation of slope from the portion A on the intrados and/or extrados of the fin, said portions A and B being defined by rectilinear segments, defining an edge of the fin at the connection between these two portions;
The ratio between the length of the portion B and the length of the portion A is less than 0.3 and the BETA angle is smaller than 20 degrees so that the existing boundary layer along the fin is very thin;
Dynamic pressure tap PB comprises at least one orifice (21) of section smaller than or equal to 1 square centimeter, said orifice is connected to at least one pressure outlet channel (3) of volume Vc and said pressure tap channel is connected to at least one plenum chamber (22) having a volume Vt, said pressure outlet channel (3) and said plenum (22) are adapted to the particular dimensions of the fin so that the ratio Vc/Vt is less than 0.1, so that said plenum chamber allows to filter rapid pressure variations induced by the aerodynamic turbulence of the portion B;
The fin is movably mounted on the aircraft fuselage and fixed to a shaft which is rotatable about an axis XX', said fin is maintained fixed in translation and along two axes of rotation, said speed measurement system comprises a small mass in order to balance the fin so that the center of gravity of the assembly constituted by the fin elements which are jointly attached, is located substantially on axis XX' and the aerodynamic center of pressure of the fin is located aft of the axis XX' relative to the direction of the speed V;
Speed measurement system further comprises, mounted on the same mobile structure, another speed indicator being a "Pitot tube" type and means for comparing the velocity measurements made by said Pitot tube and said calculating means;
The heating means (10) to avoid any risk of icing is a filament or a bar consisting of an alloy of iron-Nickel, heated by Joule effect between 50 and 500 watt in stabilized mode, said heating means (10) having a cylindrical shape of at least 2 mm in diameter and 30-80 mm in length.

It is also advantageous that:
The fin has a small wing span (9) typically comprised between 3 and 14 cm, a length of the portion A pursuant to the axis OX lower or equal to 160 mm, preferably 70 mm, a length of the portion B pursuant to the axis OX less than or equal to 30 mm, preferably 10 mm, a height h1+h2 comprised between 4 and 20 mm, an angle BETA comprised between 3 and 10 degrees relative to the axis OX so that the effects of the boundary layer along the fin is negligible.

Advantageously, the speed measurement system also allows measuring two static pressures PS1 and PS2 respectively arranged right and left of the fuselage so that the calculating means configured to determine the speed V in the Mach of the mobile body relative to ambient stream air takes into account said pressure PS I and PS2 which are functions of the aircraft sideslip angle GAMMA.

According to various features of the invention, the function F (V)=(PS−PB)/PS, for deriving the relative speed V of a mobile body with respect to a mass of ambient air (7) independently of the atmospheric conditions comprises at least one inflection point for a Mach number value comprised between 0.3 and 0.95. The said function can be approximated by a polynomial function of degree at least equal to 2.

The invention solves the above problems by also providing a method of determining the relative speed V of a mobile body with respect to an ambient air mass by means of a speed measurement system wherein the velocity V expressed in Mach number is determined in the mobile body with respect to ambient airflow (7) from values of static pressure PS and dynamic pressure PB for each value of the angle of attack angle ALPHA and/or optionally of the sideslip angle GAMMA of the speed measurement system and univocally in this direction (PS−PB)/PS to V, while in the entire subsonic and transonic domain, that is to say that for each value of the pressure tap PB and PS corresponding to an angle of attack ALPHA and/or a sideslip angle GAMMA corresponds one and only one velocity value V.

It is preferred that the foregoing method includes the following steps:

The static pressure PS is measured,
In case of slippage of the aircraft, two static pressure PS1 and PS2 are measured and static pressure PS corresponding to the average static pressures measured PS1 and PS2 is deduced
fin (1) dynamic pressure PB is measured,
For each value of the angle of attack angle ALPHA and/or aircraft sideslip angle GAMMA, a function F (V)=(PS−PB)/PS is selected univocally in the direction of (PS−PB)/PS, strictly increasing as a function of the Mach number,
A correction factor corresponding to said value of angle of attack ALPHA of the fin and/or the sideslip angle GAMMA, is applied to said function,
A new function F (V)=(PS−PB)/PS is obtained, adjusted for the influence of said angle of attack ALPHA and/or said slip angle GAMMA,
It is deduced from this said new function, the speed V expressed in Mach number of the mobile body relative to the air mass (7).

Contrary to the preconceived believes which were to think that only "Pitot" probes type having a port located forward can measure the speed of an aircraft, the object of the invention device allows with a similar cost to provide reliable airspeed and angle of attack information regardless of weather conditions and regardless of the presence in the atmosphere of solid or liquid particles (hail, heavy rain, insects, sand . . . ) throughout the flight envelope of modern aircraft.

Those skilled in the art can apply the invention in many other similar systems without departing from the scope of the invention defined in the appended claims.

The invention claimed is:

1. A speed measurement system measuring the relative velocity V of a mobile body relative to an ambient air mass independent of weather conditions, the mobile body being adapted to move at least at subsonic and transonic speeds, said speed measurement system comprising:
   an elongated fin disposed in the ambient air mass, having a profile defined by a spanwise axis ZZ' and a set of points having the coordinates X and Y forming the fin profile for each point of spanwise axis ZZ', one axis OX of X values defined sensibly pursuant to the longitudinal axis of the fin profile and an axis OY of Y values being perpendicular to the axis OX of X values comprising:
      a portion A and a portion B, said portion A having a thickness increasing in the direction of B and forming the leading edge of the fin, said portion B having a decreasing thickness and being located at the rear of portion A relative to the fin moving direction in the mass of air and forming the back of the fin,
   at least one heating means,
   at least one dynamic pressure tap PB located in the portion B, comprising at least one orifice having its opening facing in the opposite direction of the displacement direction of the fin in the mass of air,
   an angle BETA defined between the axis OX and the intrados or the extrados of the portion A of the fin,
   at least one static pressure tap PS placed on a fuselage or on a base of the fin,
   at least one means for measuring and/or calculating the angle of attack ALPHA of the fin,
   at least a calculating means configured to determine the speed V of the mobile body relative to the mass of ambient air from at least the values of static pressure and dynamic pressure,
   wherein,
   the fin is relatively thin and has a wedge shape at least in its portion A, the leading edge of the wedge is a sharp angle of radius less than or equal to 2 mm;
   the fin has at least partially a tapered and truncated shape comprising at least one sharp edge of radius less than at least 2 mm between the portion A and the portion B so that in transonic speed the wave shock created at the said sharp angle is stabilized and/or the path of field lines is modified at the aft of the fin;
   the portion B, forming the aft part of the fin, comprises at least a zone having a circular shape convex or concave B1 and/or B2 to filter particles so that the particles of greater density than the density of the air, trapped in the fluid flow to the aft of the fin, are ejected and/or spread out under the effect of centrifugal forces to the area near a pressure tap PB said B1 and/or B2 zone allowing to channel and/or to stabilize the path of the airflow to the aft of the fin, said fluid flow having a roll-shaped and/or a vortex axis substantially parallel to the axis ZZ';
   the fin comprises at least one rib disposed substantially perpendicular to the span axis ZZ' of the fin and extending at least in the portion B of the fin, said rib being adapted to the channel airflow in a region close to the dynamic pressure tap PB located at the aft of the fin;
   the function F (V)=(PS−PB)/PS enabling to deduct the relative speed V of a mobile structure with respect to a mass of ambient air independent of weather conditions, is a univocal function in the direction of (PS−PB)/PS to V, strictly increasing as a function of the speed V, this in the entire subsonic and transonic domain for each value of the angle of attack ALPHA and/or a sideslip angle GAMMA.

2. Speed measurement system according to claim 1 wherein the portion B presents a sharp variation of slope from the portion A on the intrados and/or extrados of the fin, said portions A and B being defined by rectilinear segments, defining an edge of the fin at the connection between these two portions.

3. Speed measurement system according to claim 1 wherein said fin comprises at least one rib disposed substantially perpendicular to the span axis ZZ' of the fin and extending at least in the portion B of the fin, said rib being adapted to the channel airflow in a region close to the dynamic pressure tap PB located at the aft of the fin.

4. Speed measurement system according to claim 1 wherein the ratio between the length of the portion B and the length of the portion A is less than 0.3 and the BETA angle is smaller than 20 degrees so that the existing boundary layer along the fin is very thin.

5. Speed measurement system according to claim 1 wherein the dynamic pressure tap PB comprises at least one orifice of section smaller than or equal to 1 square centimeter, said orifice is connected to at least one pressure outlet channel of volume Vc and said pressure outlet channel is connected to at least one plenum chamber having a volume Vt, said pressure outlet channel and said plenum are adapted to the particular dimensions of the fin so that the ratio Vc/Vt is less than 0.1, so that said plenum chamber allows to filter rapid pressure variations induced by the aerodynamic turbulence of the portion B.

6. Speed measurement system according to claim 1 wherein the fin is movably mounted on the aircraft fuselage and fixed to a shaft which is rotatable about an axis XX', said fin is maintained fixed in translation and along two axes of rotation, said speed measurement system comprises a small mass in order to balance the fin so that the center of gravity of the assembly constituted by the fin elements which are jointly attached, is located substantially on axis XX' and the aerodynamic center of pressure of the fin is located aft of the axis XX' relative to the direction of the speed V.

7. Speed measurement system according to claim 1 wherein the heating means includes a filament or a bar including an alloy of iron-Nickel, heated by Joule effect between 50 and 500 watt in stabilized mode, said heating means having a cylindrical shape of at least 2 mm in diameter and 30-80 mm in length.

8. Speed measurement system according to claim 1 wherein said fin has a small wing span typically comprised between 3 and 14 cm, a length of the portion A pursuant to the axis OX lower than or equal to 160 mm, a length of the portion B pursuant to the axis OX less than or equal to 30 mm, a height h1+h2 comprised between 4 and 20 mm, an angle BETA comprised between 3 and 10 degrees relative to the axis OX so that the effects of the boundary layer along the fin is negligible.

9. Speed measurement system according to claim 1 wherein said speed measurement system also allows measuring two static pressures PS1 and PS2 respectively arranged right and left of the fuselage so that the calculating means configured to determine the speed V in the Mach of the mobile body relative to ambient stream air takes into account said pressures PS1 and PS2 which are functions of the aircraft sideslip angle GAMMA.

10. Speed measurement system according to claim 1 wherein the function F (V)=(PS−PB)/PS, for deriving the relative speed V of a mobile body with respect to a mass of ambient air independently of the atmospheric conditions, comprises at least one inflection point for a Mach number value comprised between 0.3 and 0.95 and can be approximated by a polynomial function of degree at least equal to 2.

11. A method of determining the relative speed V of a mobile body with respect to an ambient air mass by means of a speed measurement system wherein the velocity V expressed in Mach number is determined in the mobile body with respect to ambient airflow from values of static pressure and dynamic pressure for each value of an angle of attack angle ALPHA and/or optionally of a sideslip angle GAMMA of the speed measurement system and univocally in this direction (PS−PB)/PS to V, while in the entire subsonic and transonic domain, for each value of the pressure taps PB and PS corresponding to an angle of attack ALPHA and/or a sideslip angle GAMMA corresponds one and only one velocity value V.

12. The method of claim 11, wherein:

the static pressure PS is measured, in case of slippage of the aircraft, two static pressures PS1 and PS2 are measured and static pressure PS corresponding to the average static pressures measured PS1 and PS2 is deduced, fin dynamic pressure PB is measured, for each value of the angle of attack angle ALPHA and/or aircraft sideslip angle GAMMA, a function F (V)=(PS−PB)/PS is selected univocally in the direction of (PS−PB)/PS, strictly increasing as a function of the Mach number, a correction factor corresponding to said value of angle of attack ALPHA of the fin and/or the sideslip angle GAMMA, is applied to said function, a new function F (V)=(PS−PB)/PS is obtained, adjusted for the influence of said angle of attack ALPHA and/or said slip angle GAMMA, it is deduced from this said new function, the speed V expressed in Mach number of the mobile body relative to the air mass.

13. A vehicle comprising the speed measurement system of claim 1.

* * * * *